(12) United States Patent
Owoc et al.

(10) Patent No.: US 11,988,347 B2
(45) Date of Patent: *May 21, 2024

(54) INTEGRATED STROBE MODULE

(71) Applicant: Apple Inc., Cupertino, CA (US)

(72) Inventors: Garrett R. Owoc, Burlingame, CA (US); Stoyan P. Hristov, San Jose, CA (US); Jason B. Neevel, Santa Clara, CA (US); Ian A. Spraggs, San Francisco, CA (US); Daniel W. Jarvis, Sunnyvale, CA (US); David A. Pakula, San Francisco, CA (US); Mikael S. Wagner, San Jose, CA (US); Blake M. Coughenour, Sunnyvale, CA (US); Gikku J. George, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/816,333

(22) Filed: Jul. 29, 2022

(65) Prior Publication Data

US 2022/0381419 A1    Dec. 1, 2022

Related U.S. Application Data

(63) Continuation of application No. 16/564,128, filed on Sep. 9, 2019, now Pat. No. 11,435,044.

(51) Int. Cl.
*F21S 10/06* (2006.01)
*F21V 5/04* (2006.01)
(Continued)

(52) U.S. Cl.
CPC .............. *F21S 10/06* (2013.01); *F21V 5/045* (2013.01); *F21V 23/0442* (2013.01);
(Continued)

(58) Field of Classification Search
CPC ............ G03B 15/03; G03B 2215/0503; G03B 2215/0567; H04M 1/0264; H04M 1/22;
(Continued)

(56) References Cited

U.S. PATENT DOCUMENTS 8,007,138 B2  8/2011  Bamba et al.
8,610,822 B2  12/2013 Weber et al.
(Continued)

FOREIGN PATENT DOCUMENTS

CN    102563525 A    7/2012
CN    203348992 U  * 12/2013
(Continued)

OTHER PUBLICATIONS

Machine translation of CN 203348992 U retrieved from the FIT database of PE2E search. (Year: 2023).*
(Continued)

*Primary Examiner* — Colin J Cattanach
(74) *Attorney, Agent, or Firm* — Dorsey & Whitney LLP

(57) ABSTRACT

A strobe module can include a Fresnel lens that defines an external surface of the strobe module and a sidewall at least partially defining an internal volume and defining an external channel. A gasket can be disposed in the external channel. A substrate can be coupled to the sidewall to further define the internal volume and a light source can be disposed on the substrate in the internal volume.

20 Claims, 12 Drawing Sheets

(51) Int. Cl.

| | | |
|---|---|---|
| *F21V 23/04* | (2006.01) | |
| *F21V 31/00* | (2006.01) | |
| *F21Y 115/10* | (2016.01) | |
| *G02B 1/04* | (2006.01) | |
| *G02B 3/08* | (2006.01) | |
| *G03B 15/03* | (2021.01) | |
| *H04M 1/02* | (2006.01) | |
| *H04M 1/22* | (2006.01) | |

(52) U.S. Cl.
CPC ............ *F21V 31/005* (2013.01); *G02B 1/041* (2013.01); *G02B 3/08* (2013.01); *F21Y 2115/10* (2016.08); *G03B 15/03* (2013.01); *G03B 2215/0503* (2013.01); *H04M 1/0264* (2013.01); *H04M 1/22* (2013.01)

(58) Field of Classification Search
CPC .. H04N 5/2256; H04N 5/2257; F21V 31/005; F21V 5/045; F21V 5/048; F21L 15/02; G02B 3/08
See application file for complete search history.

(56) References Cited

U.S. PATENT DOCUMENTS

| | | |
|---|---|---|
| 8,947,527 B1 | 2/2015 | Postovalov et al. |
| 9,110,355 B1 | 8/2015 | Nourbakhsh |
| 9,228,713 B2 | 1/2016 | Skertich, Jr. et al. |
| 9,671,099 B2 | 6/2017 | Park |
| 9,992,396 B1 | 6/2018 | Scepanovic et al. |
| 11,435,044 B2 * | 9/2022 | Owoc .................... G03B 15/05 |
| 2008/0158173 A1 | 7/2008 | Hamblin et al. |
| 2013/0229800 A1 | 9/2013 | Park |
| 2014/0218900 A1 | 8/2014 | Adair |
| 2016/0320689 A1 | 11/2016 | Butterworth |
| 2017/0126944 A1 | 5/2017 | Jagt et al. |
| 2017/0155811 A1 | 6/2017 | Jagt et al. |
| 2017/0234491 A1 | 8/2017 | Park |
| 2018/0045399 A1 | 2/2018 | Chen et al. |
| 2018/0191879 A1 | 7/2018 | Evans |
| 2018/0306405 A1 | 10/2018 | Kong |
| 2019/0120458 A1 | 4/2019 | Schneider |
| 2019/0280174 A1 | 9/2019 | Okahisa et al. |
| 2020/0072439 A1 * | 3/2020 | Okahisa .................. H01L 33/58 |
| 2020/0073207 A1 | 3/2020 | Okahisa et al. |
| 2020/0241174 A1 | 7/2020 | Fromentin et al. |
| 2020/0396359 A1 | 12/2020 | Rosen et al. |

FOREIGN PATENT DOCUMENTS

| | | | |
|---|---|---|---|
| CN | 205509972 U | 8/2016 | |
| CN | 107483677 A | * 12/2017 | ............ H04M 1/026 |
| CN | 206725915 U | 12/2017 | |
| CN | 109695859 A | 4/2019 | |
| KR | 20170062233 A | * 6/2017 | .......... H04M 1/0264 |
| KR | 20180038164 A | 4/2018 | |

OTHER PUBLICATIONS

Machine translation of CN 107483677 A retrieved from the FIT database of PE2E search. (Year: 2023).*
Machine translation of KR 20170062233 A retrieved from the FIT database of PE2E search. (Year: 2023).*

* cited by examiner

INTEGRATED STROBE MODULE

CROSS-REFERENCE TO RELATED APPLICATION(S)

This application is a continuation of U.S. application Ser. No. 16/564,128, filed Sep. 9, 2019 and entitled "INTEGRATED STROBE MODULE," the disclosure of which is incorporated herein by reference in its entirety.

FIELD

The present disclosure relates generally to electronic devices. More particularly, the present disclosure relates to output components and electronic devices including the same.

BACKGROUND

As portable electronic devices continue to include an increasingly greater number of features, integration of those features into a single device becomes increasingly complex. For example, certain features can require the emission of light from the electronic device, such as to improve the lighting of a scene imaged by the device's camera, or to project light that can interact with the ambient environment and display content to a user or to be received by the device to determine information about the environment. Further, it can be desirable for components and modules that emit light from a device to emit light with a high level of brightness, in order to improve performance or to enable various functions. Components and modules designed to emit light at such a brightness level, however, can be undesirably large and can occupy an undesirably large fraction of a device's internal volume in order to be housed therein. Accordingly, it can be desirable to provide components, modules, and device configurations, such as light emitting modules that can emit light having a high brightness level while minimizing the internal volume occupied by the light emitting module.

SUMMARY

According to some aspects of the present disclosure, a strobe module can include a Fresnel lens defining an external surface of the strobe module, a sidewall at least partially defining an internal volume and defining an external channel, a gasket disposed in the external channel, a substrate coupled to the sidewall and further defining the internal volume, and a light source disposed on the substrate in the internal volume.

In some examples, the Fresnel lens and the sidewall can include a unitary component. The Fresnel lens can be a separate component from the sidewall and can be joined thereto. The light source can include a light emitting diode (LED). The light source can include two LEDs, and the strobe module can further include an ambient light frequency sensor and a thermal sensor disposed on the substrate in the internal volume. The Fresnel lens can include polycarbonate. A portion of the Fresnel lens defining the external surface can include an acrylic hard coat.

According to some aspects, an electronic device can include a cover at least partially defining an external surface of the electronic device and defining an aperture, and a strobe module at least partially disposed in the aperture. The strobe module can include a Fresnel lens further defining the external surface of the electronic device, a sidewall at least partially defining an internal volume of the strobe module and defining a channel, a substrate coupled to the sidewall and further defining the internal volume, a light source disposed on the substrate in the internal volume, and a gasket disposed in the channel between the sidewall and the cover. The sidewall can be connected to the cover and the gasket can seal the sidewall and a surface of the cover defining the aperture.

In some examples, the electronic device can further include a flexible connector joined to the substrate and in electrical communication with the light source. The flexible connector can be joined to the substrate with solder. A distance from an internal surface of the cover to a surface of the solder protruding from the flexible connector can be less than 1 millimeter. The gasket can include an o-ring. The o-ring can include a same color as a portion of the cover defining the external surface. The light source can include an LED.

According to some aspects, a method of joining a module including a polymer to an electrical connector can include aligning an aperture defined by the electrical connector with a pad of the module, placing a portion of solder over the aperture and the pad, selectively heating and melting the portion of solder, and forming an electrical connection between the electrical connector and the pad through the solder.

In some examples, selectively heating and melting the portion of solder can include selectively exposing the portion of solder to laser light. The module can include a strobe module. The polymer can have a glass transition temperature of less than 150° C. and the polymer can remain below the glass transition temperature during the selectively heating and melting of the portion of solder. Forming the electrical connection can include solidifying the portion of solder. The solder can have a height of less than 160 microns.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
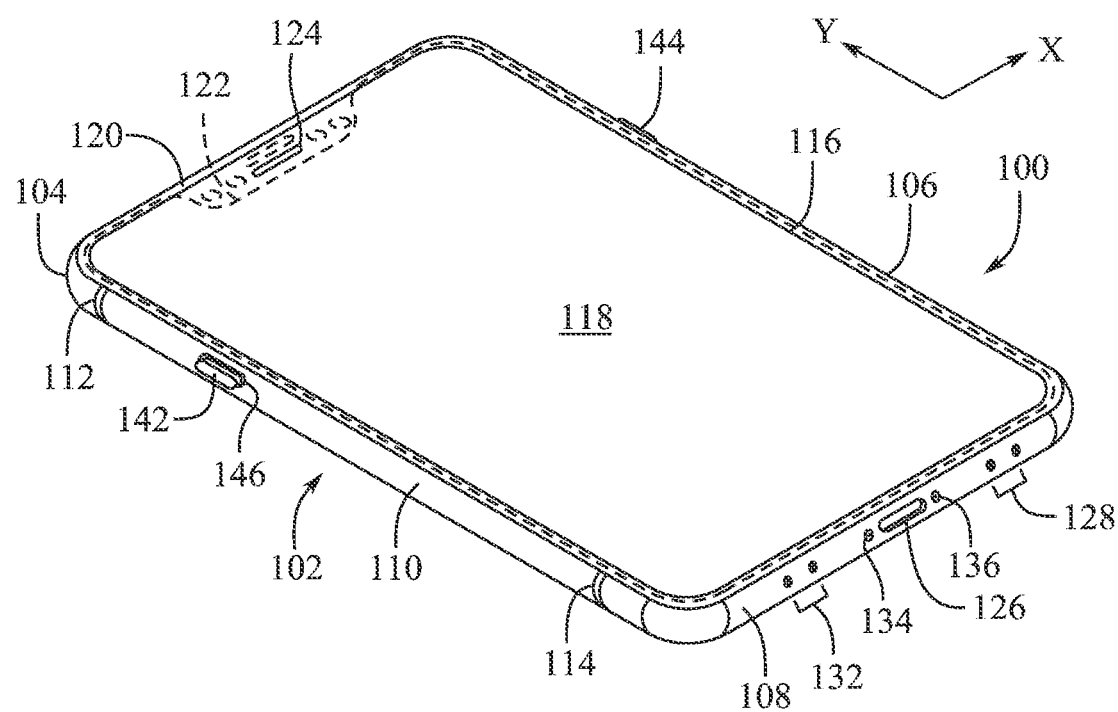
FIG. 1 shows a front perspective view of an electronic device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents, as can be included within the spirit and scope of the described embodiments, as defined by the appended claims.

According to some examples, an electronic device can include a back cover that at least partially defines an external surface of the device, and that defines an aperture. A light emitting module or a strobe module can be disposed in the aperture and can include a transparent Fresnel lens that further defines the external surface of the device. The strobe module can include a sidewall at least partially defining an internal volume of the module, and defining an exterior channel, and a substrate coupled to the sidewall that further defines the internal volume. A light source can be disposed on the substrate in the internal volume of the module, and a gasket, such as an o-ring, can be disposed in the channel. The sidewall can be coupled to the back cover, and the o-ring can provide a substantially watertight seal between the sidewall and the back cover.

Electronic devices increasingly include components that can provide a range of functionalities for the device. For example, a device such as a smart phone can include, in addition to a camera for capturing images, a light emitting component, otherwise referred to as a strobe module or flash module, that can provide a desired amount of lighting to the ambient environment, for example, to allow the camera to capture images when there is a limited amount of environmental lighting. The strobe module can perform other functions as well, such as acting as a flashlight, illuminating the ambient environment to facilitate other sensors or components of the device, serving as a signal or warning, or to display content to a user. Accordingly, it can be desirable to provide components of an electronic device, such as a strobe module, that achieve high levels of desired performance, for example, levels of performance similar to standalone strobe modules or strobe modules of dedicated camera devices, while minimizing the size or volume of such components in order to provide an electronic device that is as small as desired and that includes as many components and functions as desired.

One way to provide a component, such as a strobe module, that has a high level of performance while minimizing the space of the device's internal volume that the module occupies, is to position the module such that some or all of its dimensions occupy space that does not include components in a traditional electronic device configuration. For example, an electronic device can include a housing that includes a wall or cover having a certain thickness. In some examples, especially where a module requires access or communication with the ambient environment, the cover can include an aperture or recessed portion at the location of the module, and some or all of the module can be disposed in the aperture. As a result, some or all of the height of the module can be disposed within the thickness of the cover, above the interior surface of the cover that at least partially defines the internal volume of the device. This configuration can allow for additional components to then be positioned below the module, for example, in space that the module might otherwise occupy in a traditional device configuration.

Such a configuration can impose additional requirements on the module in order to maintain desired levels of module and device performance, as well as a desired cosmetic appearance. For example, as described herein, when a module is disposed in an aperture defined by a cover of the device, a portion of the module can define a portion of the exterior surface of the device. Consequently, it can be desirable for the exterior portion of the module to be able to withstand the rigors of device use and environmental exposure. As such, a portion of a module described herein, such as a lens, can have an exterior surface having high levels of hardness, durability, and corrosion resistance. Traditional lens materials for strobe modules cannot satisfy these performance requirements while also satisfying the optical requirements of the lens component. Accordingly, in some examples, a lens of a module can include a hard coating of a hard, durable, and/or corrosion resistant material overlying a bulk material that can be relatively easily formed into the desired lens structure, and that has the desired optical properties.

Further, as the strobe module of the device defines part of the exterior surface of the device adjacent to the cover, there can be a potential point for the undesired ingress of water or other liquids or contaminants into the device at the interface between the module and the cover. Accordingly, it can be desirable to provide a watertight seal at this location. Traditional methods of sealing electronic devices include providing glue or an adhesive at the location desired to be sealed. These traditional techniques, however, can be subject to cracking or brittle failure when under high levels of stress, for example, during a drop event or when exposed to a corrosive environment. Once this cracking has occurred, for example, due to the relative movement of components with respect to one another, the seal can no longer function as desired and the device will no longer be as waterproof as desired. In contrast, a seal formed by a gasket, such as an o-ring, can maintain a desired seal, even under high loads because it is free to deform and move in response to the loads without compromising the seal. Accordingly, it can be desirable to provide a module design that includes a gasket able to maintain a seal under a wide range of desired conditions. Since this seal can be adjacent to or near the transparent lens of the module, in some examples, it can be visible to a user. Accordingly, the gasket or o-ring, as well as any other potential visible portions of the module, can be color matched to the exterior cover of the device.

While the modules and electronic devices described herein can be designed and configured to maximize the available internal volume of the device for other components, it can be desirable to connect the module to an electrical connector in such a way that any solder or conductive material used to form the connection does not undesirably protrude from the module and occupy the space the module was designed to leave unoccupied. Further challenges can arise because one or more materials of the module, such as the polymeric material that can make up the lens, might not be able to withstand the temperatures generated by traditional bonding or soldering techniques. Accordingly, it can be desirable to provide processes for forming an electrical connection between the module and a connector component that selectively heat and melt flowable conductive material to form a connection having a low or thin profile, and that do not heat these temperature sensitive portions of the module above a desired threshold temperature.

These and other embodiments are discussed below with reference to FIGS. 1-12. However, those skilled in the art will readily appreciate that the detailed description given herein with respect to these Figures is for explanatory purposes only and should not be construed as limiting.

FIG. 1 illustrates a perspective view of an example of an electronic device 100. The electronic device 100 shown in FIG. 1 is a mobile wireless communication device, such as a smartphone. The smartphone of FIG. 1 is merely one representative example of a device that can be used in conjunction with the systems and methods disclosed herein. Electronic device 100 can correspond to any form of a wearable electronic device, a portable media player, a media storage device, a portable digital assistant ("PDA"), a tablet computer, a computer, a mobile communication device, a GPS unit, a remote-control device, or any other electronic device. The electronic device 100 can be referred to as an electronic device, or a consumer device.

The electronic device 100 can have a housing that includes a frame or a band 102 that defines an outer perimeter and a portion of the exterior surface of the electronic device 100. The band 102, or portions thereof, can be joined to one or more other components of the device as described herein. In some examples, the band 102 can include several sidewall components, such as a first sidewall component 104, a second sidewall component 106, a third sidewall component 108 (opposite the first sidewall component 104), and a fourth sidewall component 110. The sidewall components can be joined, for example, at multiple locations, to one or more other components of the device, as described herein.

In some instances, some of the sidewall components form part of an antenna assembly (not shown in FIG. 1). As a result, a non-metal material or materials can separate the sidewall components of the band 102 from each other, in order to electrically isolate the sidewall components. For example, a first separating material 112 separates the first sidewall component 104 from the second sidewall component 106, and a second separating material 114 separates the second sidewall component 106 from the third sidewall component 108. The aforementioned materials can include an electrically inert or insulating material(s), such as plastics and/or resin, as non-limiting examples. Further, as described herein, one or more of the sidewall components can be electrically connected to internal components of the electronic device, such as a support plate, as described herein. In some examples, these electrical connections can be achieved by joining a sidewall component to an internal component, for example, as part of the antenna assembly.

The electronic device 100 can further include a display assembly 116 (shown as a dotted line) that is covered by a protective cover 118. The display assembly 116 can include multiple layers (discussed below), with each layer providing a unique function. The display assembly 116 can be partially covered by a border 120 or a frame that extends along an outer edge of the protective cover 118 and partially covers an outer edge of the display assembly 116. The border 120 can be positioned to hide or obscure any electrical and/or mechanical connections between the layers of the display assembly 116 and flexible circuit connectors. Also, the border 120 can include a uniform thickness. For example, the border 120 can include a thickness that generally does not change in the X- and Y-dimensions.

Also, as shown in FIG. 1, the display assembly 116 can include a notch 122, representing an absence of the display assembly 116. The notch 122 can allow for a vision system that provides the electronic device 100 with information for object recognition, such as facial recognition. In this regard, the electronic device 100 can include a masking layer with openings (shown as dotted lines) designed to hide or obscure the vision system, while the openings allow the vision system to provide object recognition information. The protective cover 118 can be formed from a transparent material, such as glass, plastic, sapphire, or other durable transparent materials. In this regard, the protective cover 118 can be referred to as a transparent cover, a transparent protective cover, or a cover glass (even though the protective cover 118 sometimes does not include glass material). Further, in some examples, the vision system can include one or more modules as described herein, such as light emitting modules and/or strobe modules.

As shown in FIG. 1, the protective cover 118 includes an opening 124, which can represent a single opening of the protective cover 118. The opening 124 can allow for transmission of acoustical energy (in the form of audible sound) into the electronic device 100, which can be received by a microphone (not shown in FIG. 1) of the electronic device 100. The opening 124 can also, or alternatively, allow for transmission of acoustical energy (in the form of audible sound) out of the electronic device 100, which can be generated by an audio module (not shown in FIG. 1) of the electronic device 100.

The electronic device 100 can further include a port 126 designed to receive a connector of a cable assembly. The port 126 allows the electronic device 100 to communicate data (send and receive), and also allows the electronic device 100 to receive electrical energy to charge a battery assembly. Accordingly, the port 126 can include terminals that electrically couple to the connector.

Also, the electronic device 100 can include several additional openings. For example, the electronic device 100 can include openings 128 that allow an additional audio module (not shown in FIG. 1) of the electronic device to emit acoustical energy out of the electronic device 100. The electronic device 100 can further include openings 132 that allow an additional microphone of the electronic device to receive acoustical energy. Furthermore, the electronic device 100 can include a first fastener 134 and a second fastener 136 designed to securely engage with a rail that is coupled to the protective cover 118. In this regard, the first fastener 134 and the second fastener 136 are designed to couple the protective cover 118 with the band 102.

The electronic device 100 can include several control inputs designed to facilitate transmission of a command to the electronic device 100. For example, the electronic device 100 can include a first control input 142 and a second control input 144. The aforementioned control inputs can be used to adjust the visual information presented on the display assembly 116 or the volume of acoustical energy output by an audio module, as non-limiting examples. The controls can include one of a switch or a button designed to generate a command or a signal that is received by a processor. The control inputs can at least partially extend through openings in the sidewall components. For example, the second sidewall component 106 can include an opening 146 that receives the first control input 142. Further details regarding the features and structure of an electronic device are provided below, with reference to FIG. 2.

Figure 2:
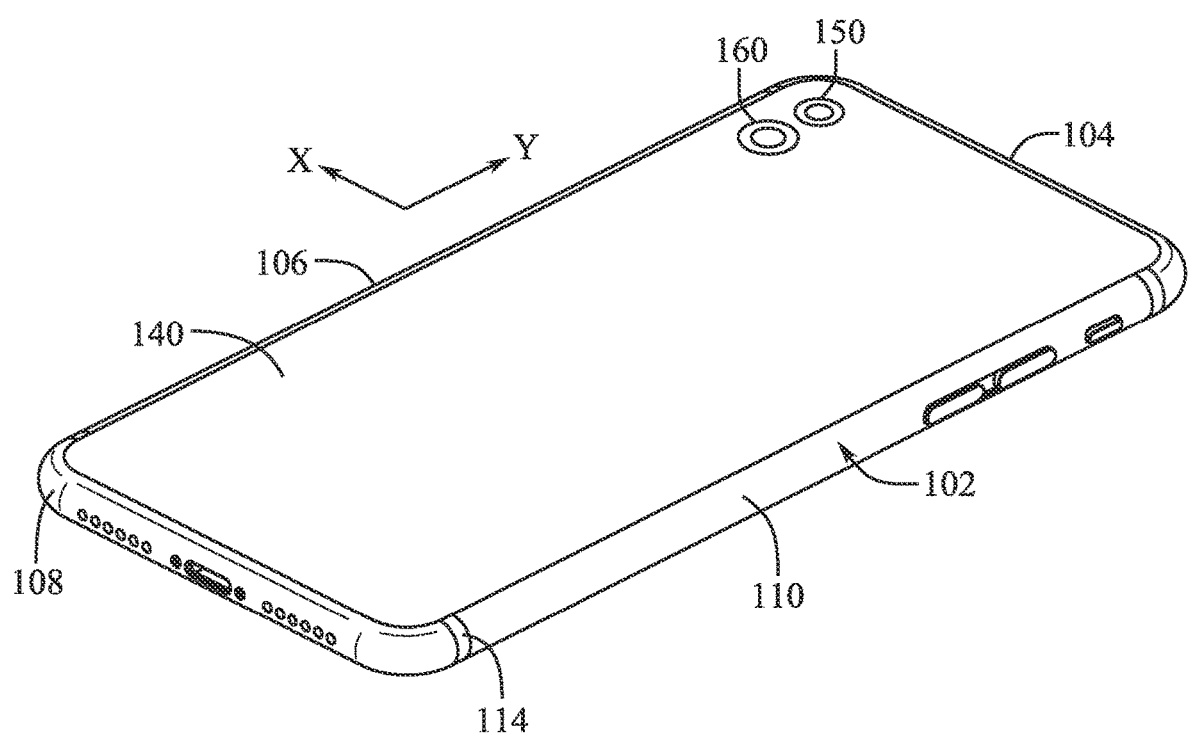
FIG. 2 shows a rear perspective view of the electronic device of FIG. 1.

FIG. 2 shows a rear perspective view of the electronic device of FIG. 1. As can be seen, the device 100 can further include a back cover or back protective layer 140 that can cooperate with the band 102 and protective cover 118 to further define the internal volume and exterior surface of the device 100. The back cover 140 can be formed from any desired material, such as, metals, plastics, ceramics, composites, or combinations thereof. In some examples, the back cover 140 can be formed from the same or a similar material to the protective cover 118. In some examples, the back cover 140 can be a conductive transparent material, such as indium titanium oxide or a conductive silica. In some examples, the back cover 140 can define one or more apertures that can receive any variety of desired components, such as a camera or imaging module 160 and a light emitting or strobe module 150. Further details regarding the features and structure of an electronic device are provided below, with reference to FIG. 3.

Figure 3:
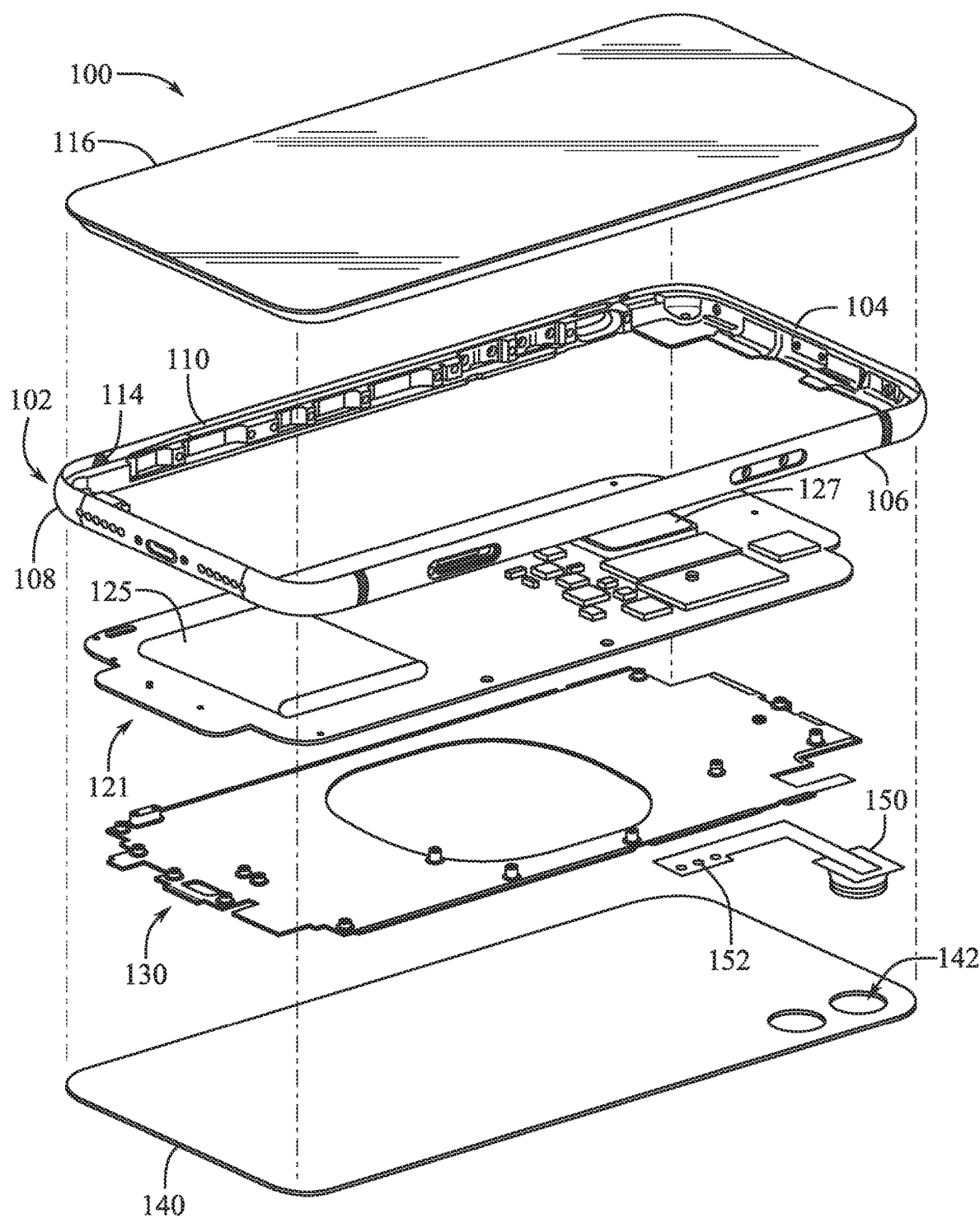
FIG. 3 shows an exploded view of the electronic device of FIG. 1.

FIG. 3 illustrates an exploded view of the electronic device 100. The housing of the device 100, including the band 102, can include one or more features to receive or couple to other components of the device 100. For example, the band 102 can include any number of features such as apertures, cavities, indentations, and other mating features to receive and/or attach to one or more components of the device 100.

The device 100 can include internal components, such as a system in package (SiP) 127, including one or more integrated circuits such as a processors, sensors, and memory. The device 100 can also include a battery 125 housed in the internal volume of the device 100. Additional components, such as a haptic engine, can also be included in the device 100. The electronic device 100 can also include a display assembly 116, described herein. In some examples, the display assembly 116 can be received by and/or be attached to the band 102 by one or more attachment features. In some examples, one or more of these internal components can be mounted to a circuit board 121. The electronic device 100 can further include a support plate 130, also referred to as a back plate or chassis, that can provide structural support for the electronic device 100. The support plate 130 can include a rigid material, such as a metal or metals.

Such components can be disposed within an internal volume defined, at least partially, by the band 102, and can be affixed to the band 102, via internal surfaces, attachment features, threaded connectors, studs, posts, and/or other fixing features, that are formed into, defined by, or otherwise part of the band 102. In some examples, an attachment feature can be formed by an additive process and/or a subtractive process, such as machining.

The electronic device 100 can also include a light emitting or strobe module, 150 as described herein. In some examples, the strobe module 150 can be joined to, and can be in electrical communication with, an electrical connector 152. In some examples, the electrical connector 152 can be a flexible connector 152, and can further electrically connect the strobe module 150 to one or more other components of the device 100, such as a controller and/or microprocessor. As can be seen, in some examples, all or a portion of the strobe module 150 can be disposed in and/or received by the aperture 142 defined by the back cover 140. Thus, in some examples, a surface of the strobe module 150 can at least partially define an exterior surface of the device 100. In some examples, the strobe module 150 can be coupled to, mounted on, or otherwise supported by the back cover 140, for example, by an adhesive and/or by mounting hardware, as described herein. The back cover 140 can also be attached to the band 102, for example, via the one or more attachment features or by any other desired techniques, for example, by an adhesive.

Any number or variety of electronic device components can include one or more modules, as described herein, such as a strobe module. The process for joining such a module to an electrical connector can include any form of localized heating and or cooling process that can melt, flow, or reflow conductive material to electrically connect the module to one or more other components of an electronic device without undesirably heating desired portions of the module. An electronic device including the module can include a cover defining an exterior surface of the device and an aperture. In some examples, the module can further define the exterior surface, and can be disposed in the aperture such that one or more desired components of the module can be positioned between the exterior surface and an interior surface of the cover. Various examples of modules and electronic devices including the same, as well as processes for electrically connecting the same to other device components, are described below with reference to FIGS. 4-8.

Figure 4:
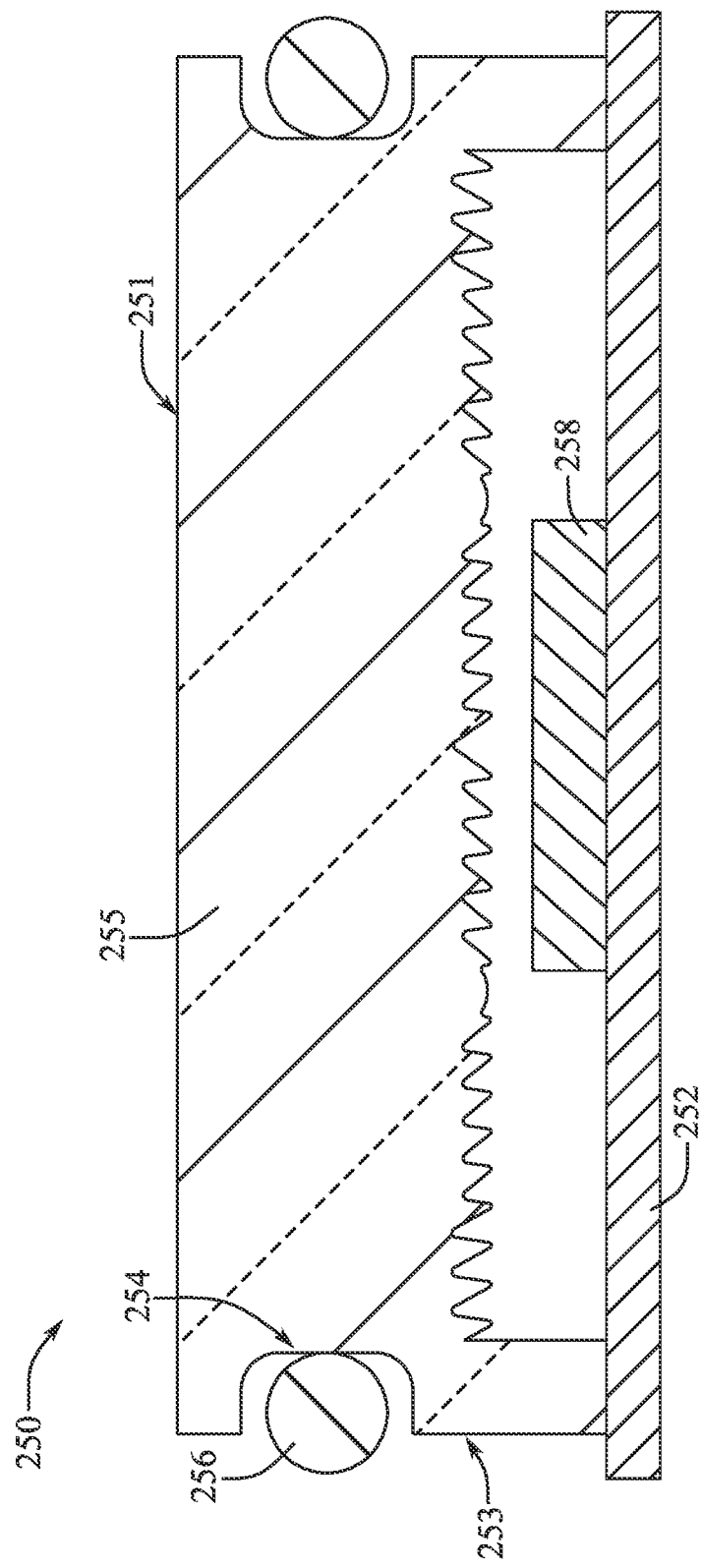
FIG. 4 shows a cross-sectional view of an embodiment of a module of an electronic device.

FIG. 4 illustrates a perspective view of a module 250 that can be a strobe module 250 or light emitting module 250 and that can be included in an electronic device as described herein. The strobe module 250 can include some or all of the features of the modules described herein, such as strobe module 150 described with respect to FIGS. 2-3. In the present example, the strobe module 250 can include a lens 255 that can be formed from or comprise a transparent material, such as one or more transparent polymeric materials.

In some examples, the lens 255 can be a compact lens, such as a Fresnel lens as described herein, and can define an external surface 251 of the strobe module 250. In some examples, this external surface 251 can at least partially define the external surface of an electronic device, as described herein. The lens 255 can comprise a transparent polymer, such as polycarbonate. Further, the portion of the lens 255 defining the external surface 251 can comprise a second, different material that can be harder than the material defining the bulk portion of the lens and/or the optical features of the Fresnel lens 255. For example, the portion of the lens 255 defining the external surface 251 can comprise an acrylic hard coat material.

The strobe module 250 can further comprise a sidewall 253 that can at least partially define an internal volume of the strobe module 250 and can also define an external channel 254. In some examples, the sidewall 253 and the lens 255 can be a unitary or singular component, for example comprising a continuous portion of a material, such as a transparent polymer as described herein. A gasket 256 can be disposed in the channel 254 defined by the sidewall 253. In some examples, the gasket 256 can serve to provide a seal between the sidewall 253 and a component disposed around the sidewall 253, for example a cover of an electronic device defining an aperture in which the strobe module 250 can be disposed, as described herein. In some examples, the gasket 256 can be an o-ring.

In some examples, the sidewall 253 can be coupled to a substrate 252 that can further define the internal volume of the strobe module 250. The sidewall 253 and substrate 252 can be coupled by any desired method, including by gluing or with an adhesive. Accordingly, in some examples, the sidewall 253, the lens 255, and the substrate 252 can cooperate to define the internal volume of the strobe module 250. In some examples, the substrate can include a polymeric material, metallic material, ceramic material, or combinations thereof, and can be, for example, a printed circuit board. A light source 258 can be disposed on the substrate 252 in the internal volume of the strobe module 250. The light source 258 can be an electrically powered light source 258, such as an LED light source 258. In some examples, the light source 258 can be electrically connected to the substrate 252 and/or one or more other components of an electronic device including the strobe module 250 as described herein. Further details regarding the features and the structure of various example of a light emitting module 350 are provided below, with reference to FIG. 5.

Figure 5:
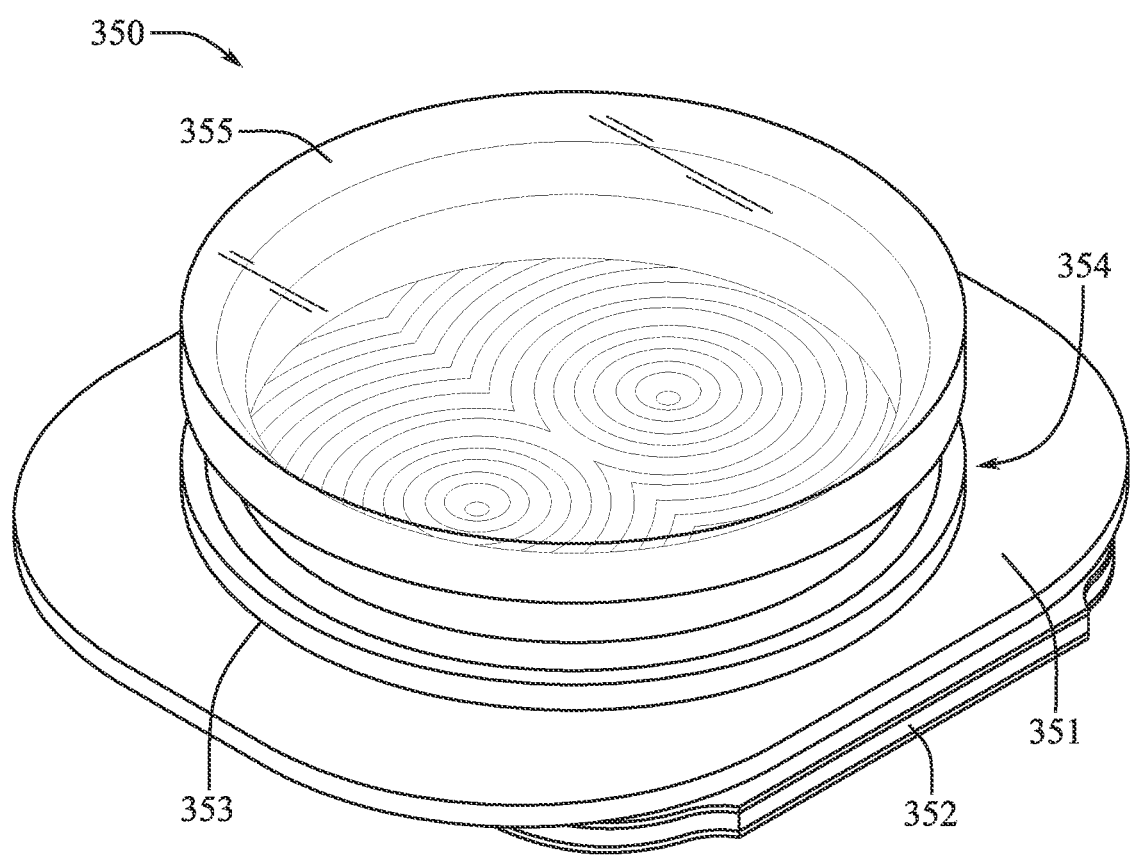
FIG. 5 shows a perspective view of a module of an electronic device.

FIG. 5 illustrates a perspective view of a module 350 that can be a strobe module 350 or a light emitting module 350 that can be included in an electronic device, as described herein. The strobe module 350 can include some or all of the features of the modules described herein, such as strobe module 150 described with respect to FIGS. 2-3. In the present example, the strobe module 350 can include a lens 355 that can be formed from, or can include, a transparent material.

The lens 355 can at least partially define an exterior surface of the strobe module 350 as shown, and in some examples, where the strobe module 350 can at least partially define an exterior surface of an electronic device, the lens 355 can at least partially define the exterior surface of the electronic device. In some examples, the lens 355 can include transparent polymeric materials, transparent ceramic materials, or combinations thereof. In some examples, the lens 355 can include polycarbonate material. In some examples, the portion of the lens 355 that at least partially defines the exterior surface of the strobe module 350 can be treated or coated, such as to increase hardness, durability, chemical resistance, and/or corrosion resistance. Thus, in some examples, the lens 355 can further include a hard coat material, such as a layer of an acrylic hard coat material, as described herein.

In some examples, the lens 355 can be any desired form or design of lens. In some examples, the lens 355 can be a compact lens, such as a Fresnel lens. In some examples, the lens 355 can be a multifocal lens. For example, the lens 355 can be a singular or unitary component, and can include multiple regions that have separate or different focal points and/or focal lengths. In some examples, the lens 355 can have any desired peripheral shape, although in certain examples, the lens 355 can have a substantially circular or rounded peripheral shape. That is, in some examples, the lens 355 can be substantially cylindrical. In some examples, the lens 355 can be formed by additive manufacturing processes, subtractive manufacturing processes, or combinations thereof. For example, the lens 355 can be formed by an injection molding and/or machining process.

As used herein, the term 'transparent' can refer to a material or component, such as the lens 355 that allows a desired wavelength or range of wavelengths of light to pass therethrough. In some examples, the desired range of wavelengths of light can include visible light, ultraviolet light, infrared light, or combinations thereof. Although in some examples a transparent material or component can allow substantially all the incident light of a desired wavelength or range of wavelengths to pass therethrough, in some examples, a transparent material that allows about 90% of incident light, 80% of incident light, 70% of incident light, 60% of incident light, or even 50% of incident light or less to pass therethrough can be useful in certain applications.

The module 350 can further include a housing or sidewall 353 that can at least partially surround and define an internal volume of the module 350. The sidewall 353 can at least partially define an exterior surface of the module. In some examples, the sidewall 353 can assume any desired shape, although in certain examples, the sidewall 353 can have a perimeter corresponding to or the same as a peripheral shape of the lens 355. The sidewall 353 can also define an external channel 354. In some examples, the channel can at least partially surround the internal volume defined by the sidewall 353, and can have an overall shape corresponding to, in line with, and/or similar to a peripheral shape of the lens 355. The channel 354 can have any desired cross-sectional shape, although in some examples, the channel 354 can have a substantially rectangular cross-sectional shape or profile.

In some examples, the sidewall 353 can further include a base portion or flange 351 that can extend from the portion of the sidewall 353 that at least partially defines the internal volume. In some examples, the base portion or flange can extend approximately perpendicularly therefrom and can be coupled to and/or abut one or more other components, for example, to retain the sidewall 353, and thus module 350, in the device.

In some examples, the sidewall 353 can include the same material or materials as the lens 355. In some other examples, however, the sidewall 353 can include any desired material or combination of materials, such as polymeric materials, ceramic materials, metallic materials, or combinations thereof. In some examples, the sidewall 353 can be a separate component or portion from the lens 355, and can be joined or bonded thereto by any technique known in the art or developed in the future, such as with adhesive or glue. In some other examples, the sidewall 353 and the lens 355 can be a singular or unitary body or component. That is, in some examples, the sidewall 353 and the lens 355 can be portions of the same component and can be formed from, or can include, the same materials. In some examples, the sidewall 353 can be manufactured by an additive manufacturing process, subtractive manufacturing processes, or combinations thereof. For example, the sidewall 353 can be injection molded and the channel 354 can be formed in an exterior surface thereof by a machining process.

The module 350 can also include a substrate 352 that can further define the internal volume of the module 350. The substrate 352 can include any desired material or combination of materials, and in some examples, can be a circuit board, such as a printed circuit board. Accordingly, the substrate can include one or more electrical components and/or electrical contacts or connections. In some examples, and as described further herein, one or more light sources (not shown) can be disposed on the substrate 352 and disposed in the internal volume. For example, the light sources can be disposed on the substrate 352 below the lens 355 so that light emitted from the light sources can pass through the lens 355. The substrate 352 can be coupled to the sidewall 353, for example, at the base or flange portion 351 of the sidewall 353. In some examples, the substrate can be coupled to the light emitting module 350 by any method known in the art or developed in the future, such as with an adhesive or a glue. Further details regarding the features and the structure of various examples of a light emitting module 450 are provided below, with reference to FIG. 6.

Figure 6:
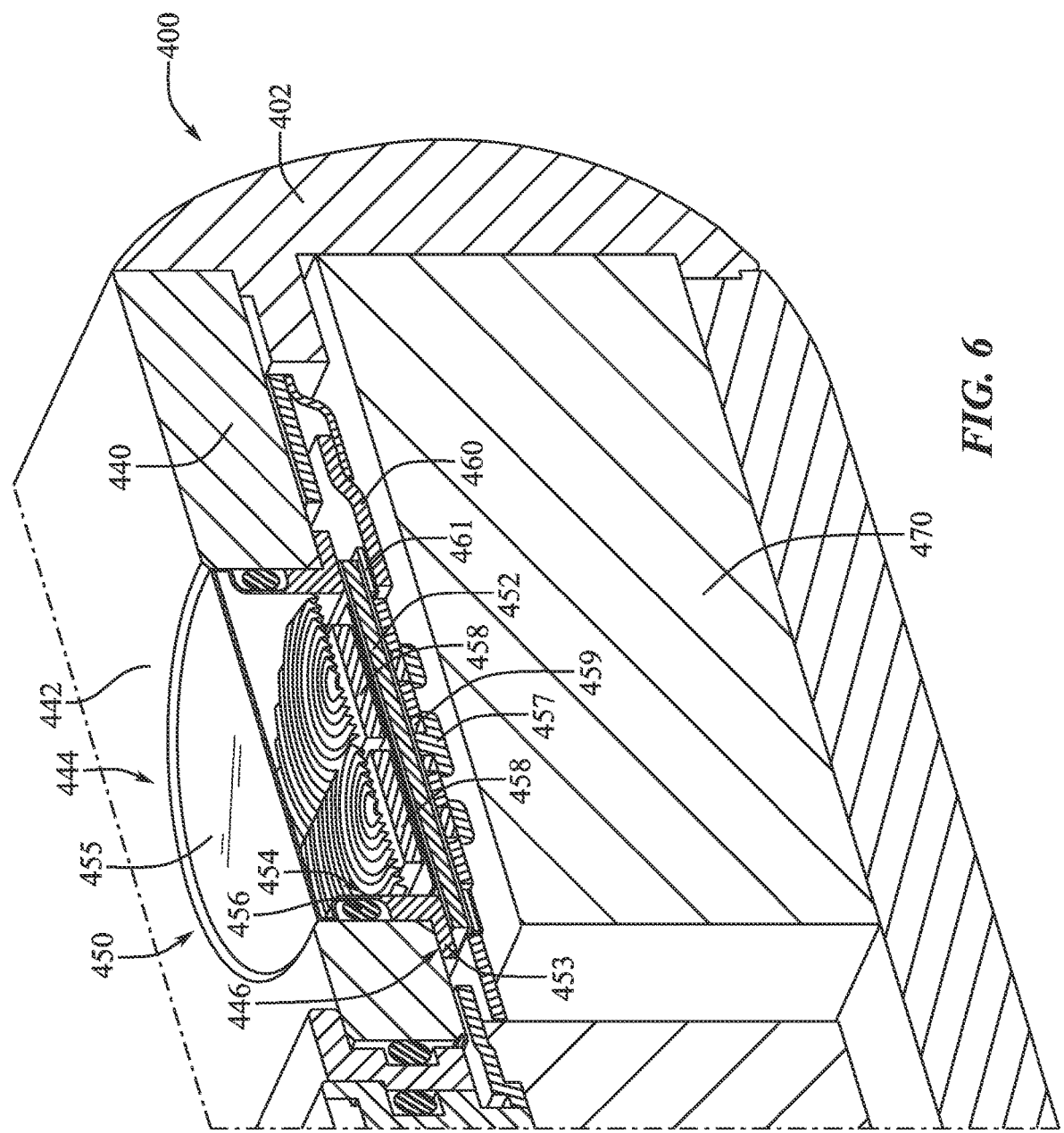
FIG. 6 shows a cross-sectional view of an electronic device including a module.

FIG. 6 shows a cross-sectional view of an electronic device 400 including a module 450, such as a strobe module 450. The electronic device 400 can be substantially similar to, and can include some or all of the features of the electronic devices described herein, such as electronic device 100 described with respect to FIGS. 1-3, while the strobe module can be substantially similar to and can include some or all of the features of the modules described herein, such as module 250, 350 described with respect to FIGS. 4-5.

The electronic device 400 can include a band 402 that can at least partially define an internal volume of the device 400. The electronic device 400 can also include a back cover 440 that can be attached or coupled to the band 402 to further define the internal volume of the device 400. The back cover 440 can include an exterior surface 442 and an opposing interior surface 446. In some examples, the exterior surface 442 can at least partially define an exterior surface of the device 400 itself, while the interior surface 446 can partially define the internal volume of the device 400. As described herein, the back cover 440 can also define an aperture 444. In some examples, the back cover 440 can include any desired material, such as polymeric materials, ceramic materials, metallic materials, composite materials, or combinations thereof. In some examples, the back cover 440 can include a ceramic material such as glass or sapphire. Further, in some examples, the back cover 440 can have a thickness of about 2 millimeters, about 1.5 millimeters, about 1 millimeter, about 0.9, 0.8, 0.7, or even 0.5 millimeters or thinner at the location of the aperture 444.

As described with respect to module 350, the module 450 can include a lens 455 including a transparent material or materials, such as transparent polymeric or ceramic materials. The lens 455 can include some or all of the features of lens 355 and can be a Fresnel lens. In some examples, the lens 455 can be disposed in the aperture 444. Thus, the exterior surface of the lens 455 can at least partially define an exterior surface of the device 400. In some examples, the lens 455 can have a peripheral shape corresponding to the peripheral shape of the aperture 444. In some examples, the exterior surface of the lens 455 can be substantially level or in line with the exterior surface 442, however, in some other examples, the exterior surface of the lens 455 can be recessed from the exterior surface 442. The exterior surface 442 can include one or more non-planar features at least partially surrounding the aperture 444 and the lens 455, such as the illustrated chamfer.

Similar to module 350, the module 450 can include a sidewall 453 defining an internal volume of the module, and an external surface that defines a channel 454. In some examples, the sidewall 453 can be coupled to, abut, or be adjacent to the back cover. In some examples, at least a portion of the sidewall 453 can be disposed adjacent to or abutting the surface 446 of the back cover and/or the surface of the back cover defining the aperture 444. For example, the flange or base portion of the sidewall 453 can extend below or beneath the back cover 440 and can abut or be adjacent to the surface 446 at that location.

A gasket 456 can be disposed in the channel 454, and can abut or contact the sidewall 453 and the back cover 440 to form or provide a seal therebetween. In some examples, the gasket 456 can provide a substantially watertight and/or airtight seal between the sidewall 453 and the back cover 440. Further, the gasket 456 can be maintained in the channel 454 by the portions of the back cover 440 abutting or disposed adjacent to the portions of the sidewall 453 above and below the channel. In some examples, the gasket 456 can include a compliant material, such as a polymeric material. In some examples, the gasket 456 can include a rubber compound. The gasket 456 can substantially surround the internal volume of the module 450, and can have a peripheral shape and size corresponding to the shape and size of the channel 454. In some examples, the gasket 456 can have any one or a combination of a variety of cross-sectional shapes or profiles, such as a rounded or circular cross-sectional shape. In some examples, the gasket 456 can be an o-ring. In some examples, the gasket 456 can be at least partially visible to a user, for example, through the transparent material of the lens 455. Accordingly, in some examples, the gasket 456 can have a same or similar color to the color of the surface 442 of the back cover 440. In some examples, the gasket 456 can include one or more dyes or color particles to achieve a desired color.

Further, in some examples, the channel 454 can have a larger cross-sectional area than the o-ring 456, and can allow for the gasket 456 to move within the channel 454 without breaking or interrupting the seal formed between the sidewall 453 and the back cover 440. Advantageously, the ability of the gasket 456 to move within the channel 454, and with respect to both sidewall 453 and back cover 440, while maintaining contact with those components can allow for the maintenance of the seal between the sidewall 453 and the back cover 440, even when undesirable stresses are being exerted thereon. For example, a traditional seal formed between the sidewall 453 and the back cover 440 that includes a rigid or non-moveable sealing component, often fails during a high stress event, such as a drop event, thereby allowing potential liquid ingress into the internal volume of the device at that location. In contrast, the ability of the gasket 456 to move with respect to the sidewall 453 and the back cover 440 allows the gasket to deform and even absorb stresses on these components, thereby maintaining the seal during a high stress event, and advantageously continuing to prevent liquid ingress at the seal location.

While the example described with respect to FIG. 6 include a gasket 456 to provide a seal between the back cover 440 and the module 450, in some examples, substantially any method or sealing component can be used to provide a seal between the back cover 440 and the module 450, such as adhesives, other forms or gaskets, or any other sealing method or component.

The substrate 452, such as the printed circuit board described herein with respect to substrate 252, can be coupled to the sidewall 453, for example, at the flange or base portion thereof. The substrate 452 can further define the internal volume of the module 450. One or more light sources 458 can be disposed on the substrate 452 in the internal volume of the module 450. The light sources 458 can include light emitting diodes (LEDs), as described herein. In some examples, the light sources 458 can be electrically connected to other components of the device 400, for example, through contacts or vias in the substrate 452. The substrate 452 can include contacts on an exterior surface thereof that can be in electrical communication with a connector 459. The connector 459 can be a flexible electrical connector 459 and can be electrically connected to the contact portions of the substrate 452 by a conductive material, such as portions of solder 457, conductive epoxy, or other conductive materials, as described herein.

The module 450 can be retained in a desired position in the electronic device 400, for example, at least partially disposed in the aperture 444, by any desired methods or components. In some examples, a brace 460 can retain the module 450 in a desired position and location. The brace 460 can be secured to other components of the device, such as the back cover 440 and/or the band 402, and can abut or be disposed adjacent to an exterior surface of the substrate 452 to retain the module 450. In some examples, the brace 460 can exert a biasing force against the module 450 to retain the module 450 in a desired position and location, and to maintain a positional relationship between portions of the module 450, such as the sidewall 453 and the back cover 440. In some examples, a compliant material such as foam 461 can be disposed between the brace 460 and portions of the module 450 such as the substrate 452. The foam 461 can allow for the absorption or dissipation of forces exerted on the module 450 or the device 400, while still maintaining the tolerance ranges of the components therein.

As can be seen, the orientation and configuration of the module 450 and the back cover 440 are such that many of the components of the module 450 are disposed in the aperture 444 between the exterior surface 442 and the interior surface 446 of the back cover 440. For example, the lens 455, portions of the sidewall 453, the gasket 456, and some or all of the light sources 458 can be disposed in the aperture between the surfaces 442, 446 of the back cover 440.

Whereas some traditional strobe module and electronic device designs can have the substantial entirety of the strobe module disposed within the internal volume of the device below an interior surface 446 of a back cover 440, the present configuration allows for only a portion of the module 450, such as the relatively thin substrate 452, to be disposed in the internal volume of the device below surface 446. Accordingly, such a design can maximize the space within the internal volume that is not occupied by the strobe module 450. The exemplary configuration can allow for increased utilization of the space below the strobe module 450. In some examples, this design can allow for a thinner overall device 400 compared to traditional device configurations. In some examples, this design can allow for other components, such as component 470 to be disposed directly below the module 450 that would not otherwise have been able to occupy this space without necessitating an increase in device thickness. As a result, additional components and features can be included in an electronic device 400 without increasing the device thickness or size because a large portion of the volume of the module 450 is disposed above the surface 446 that partially defines the internal volume. Further details regarding the features and structure of example of a module 550 are provided below, with reference to FIG. 7.

Figure 7:
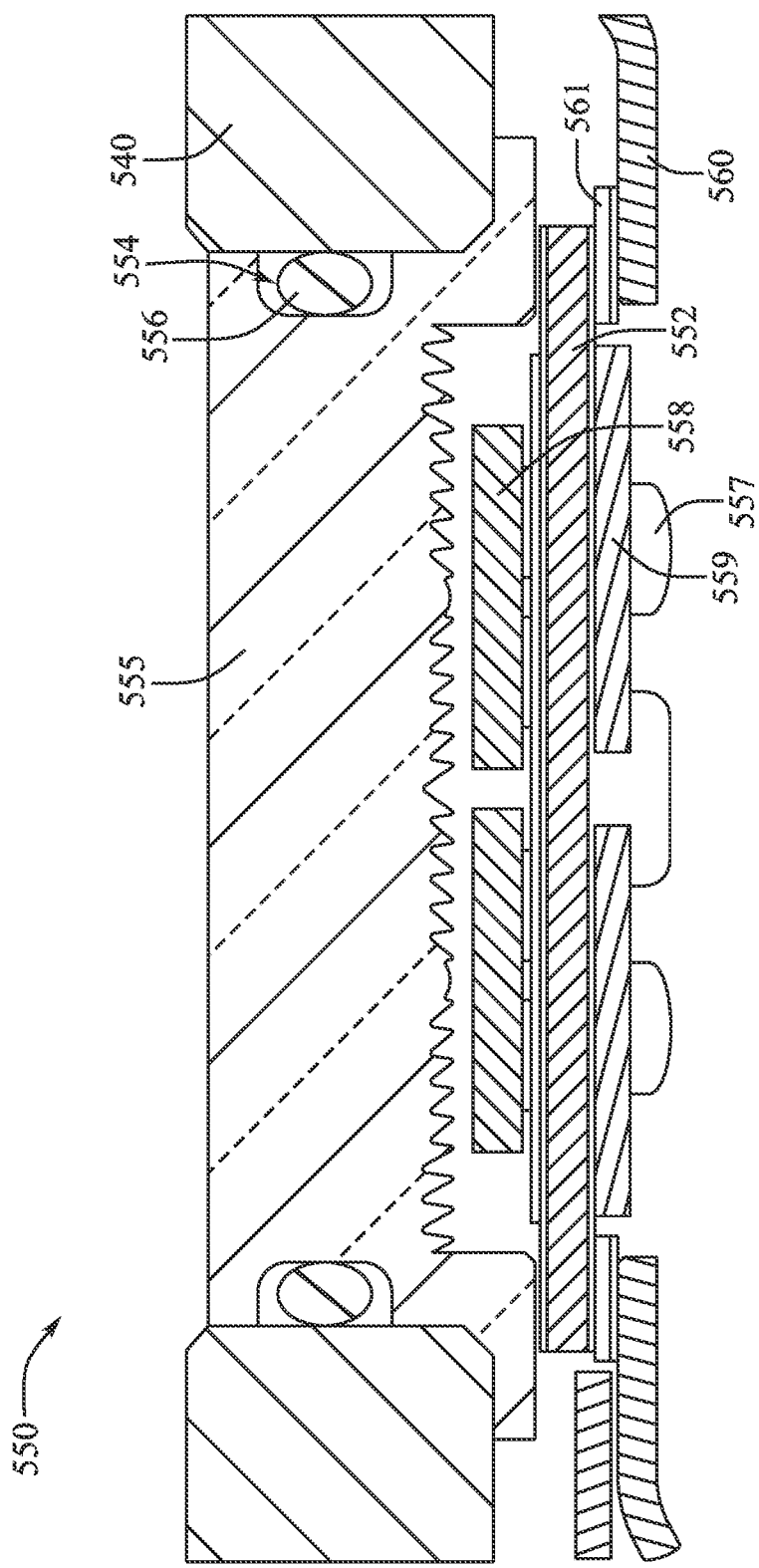
FIG. 7 shows a cross-sectional view of a module of an electronic device.

FIG. 7 shows a cross-sectional view of a module 550 of an electronic device, for example, a strobe module or light emitting module, as described herein. The module 550 can be substantially similar to, and can include some or all of the features of, any of the modules described herein, such as module 150, 250, 350, 450 described herein with respect to FIGS. 3-6.

As can be seen, the module 550 can be disposed in an aperture defined by a cover 540 of an electronic device, and can abut or be disposed adjacent to the surface of the cover 540 defining the aperture. In some examples, the module 550 can be at least partially retained in a desired position by a brace 560 that can be coupled to, or can exert a retaining force on, the module 550, for example, through the substrate 552. In some examples, a compliant component 561, such as a foam portion, can be disposed between the substrate 552 and the brace 560. In some examples, the foam 561 can prevent direct contact between the brace 560 and the module by absorbing or dissipating forces exerted on the module 550 by the brace that might otherwise damage or exert undesirable loads on the substrate 552.

In the present example, the lens 555 includes the features of the sidewalls 253, 353, 453 described herein, and can be considered a singular or unitary component with the sidewall. That is, in some examples, the lens 555 can include a surface that defines a groove or channel 554, as well as a flange or base portion that can abut or be disposed adjacent to an interior surface of the back cover 540. As with other modules described herein, a gasket, such as an o-ring 556, can be disposed in the channel 554 and can seal the lens 555 and the back cover 540, for example, to prevent the undesired ingress of liquids.

As the lens 555 can at least partially define an exterior surface of both the module 550 and the electronic device in which the module can be included, in some examples, it can be desirable for the exterior surface of the lens 555 to have high levels of hardness, durability, corrosion resistance, and/or chemical resistance. In some examples, the bulk material of the lens 555, that is the material including the optical features of the Fresnel lens 555, can be selected based on properties such as cost, ease of manufacturing, and/or optical properties, and will not have the desired properties to function as an external surface of an electronic device. In such instances, a material can be coated, formed, deposited, or otherwise integrated into or onto the surface of the lens 555 that can be exposed to the ambient environment. In some examples, this coating material can be referred to as a hard coat or a hard coat material. The hard coat material can include any desired material that is transparent to the desired wavelengths or range of wavelengths of light and that has a desired level of hardness, durability, corrosion resistance, chemical resistance, aesthetic appearance, and other desirable exterior characteristics.

In some examples, the hard coat can include a polymeric material, a ceramic material, or combinations thereof. In some examples, the hard coat can include a polymeric material such as acrylic. The hard coat can be formed by any method or process known in the art or developed in the future. In some examples, the hard coat can cover or overlie substantially the entire surface of the lens 555 that can be exposed to the ambient environment. For example, the hard coat can be applied any or all of the surface of the lens 555 disposed above the gasket 556. In some examples, the entire exterior surface of the lens 555 can include the hard coat material. In some examples, the hard coat can have a thickness of less than about 100 microns, less than about 50 microns, less than about 25 microns, or less than about 15 microns or fewer. In some examples, the hard coat can have a thickness between 1 microns and 15 microns, between 5 microns and 15 microns, or between 8 microns and 12 microns, for example, about 10 microns.

As with certain module examples described herein, the module 550 can include light sources 558 that are electrically connected to, and disposed on, a substrate 552. In some examples, the light sources 558 can include one or more LEDs. Accordingly, in this particular example, the module 550 can include two LEDs 558 disposed on the substrate 552 in the internal volume defined by the lens 555 and the substrate. The substrate 552 can further include one or more electrical contacts or pads disposed on a side that defines an exterior surface of the module 550, for example, the side opposite the LEDs 558. The contact pads can electrically connect components disposed on the substrate, for example, in the internal volume of the module 550, to one or more other components of the device. The contact pads of the substrate can be electrically connected to corresponding contacts of an electrical connector, such as a flexible electrical connector 559. The electrical contact between the substrate 552 and the connector 559 can be achieved or facilitated by a conductive bonding material, such as portions of solder 557. In some examples, each corresponding substrate 552 contact and flexible connector 559 contact can be electrically connected by a separate portion of conductive material or solder 557. The substrate 552 and the connector 559 can include any number of corresponding contacts, for example, between 1 and 20 contacts. In one example embodiment, the substrate 552 includes 8 contacts.

As described herein, it can be desirable for the module 550 to be as thin as possible in order to allow other components or features of the device to occupy the internal volume of the device that might have otherwise been occupied by the module 550. Accordingly, it can be desirable to minimize the distance that the portions of solder 557 protrude from the flexible connector 559. In some examples, a solder portion 557 can protrude less than about 160 microns from the surface of the contact pad of the substrate 552. In some examples, the height from the interior surface of the cover 540 to the furthest surface of the solder 557 can be less than 1000 microns, less than 900 microns, less than 850 microns, less than 800 microns, less than 750 microns, or less than 700 microns or smaller. In some examples, this height can be about 835 microns.

Further, in order to prevent undesirable contact between the solder 557 and other components of the device including the module 550, a protective layer or component can be provided over the solder portions 557. In some examples, this protective component can be a piece or pieces of tape or other relatively thin, non-conductive material that can serve to prevent or inhibit any inadvertent electrical contact between the solder 557 and other conductive portions of the device, including the module 550. This arrangement can allow for components to be disposed below or adjacent to module 550 that would not otherwise function as desired if the solder 557 is not protected, as described. Additional structures and configurations of some examples of a module 650 are described below, with reference to FIG. 8.

Figure 8:
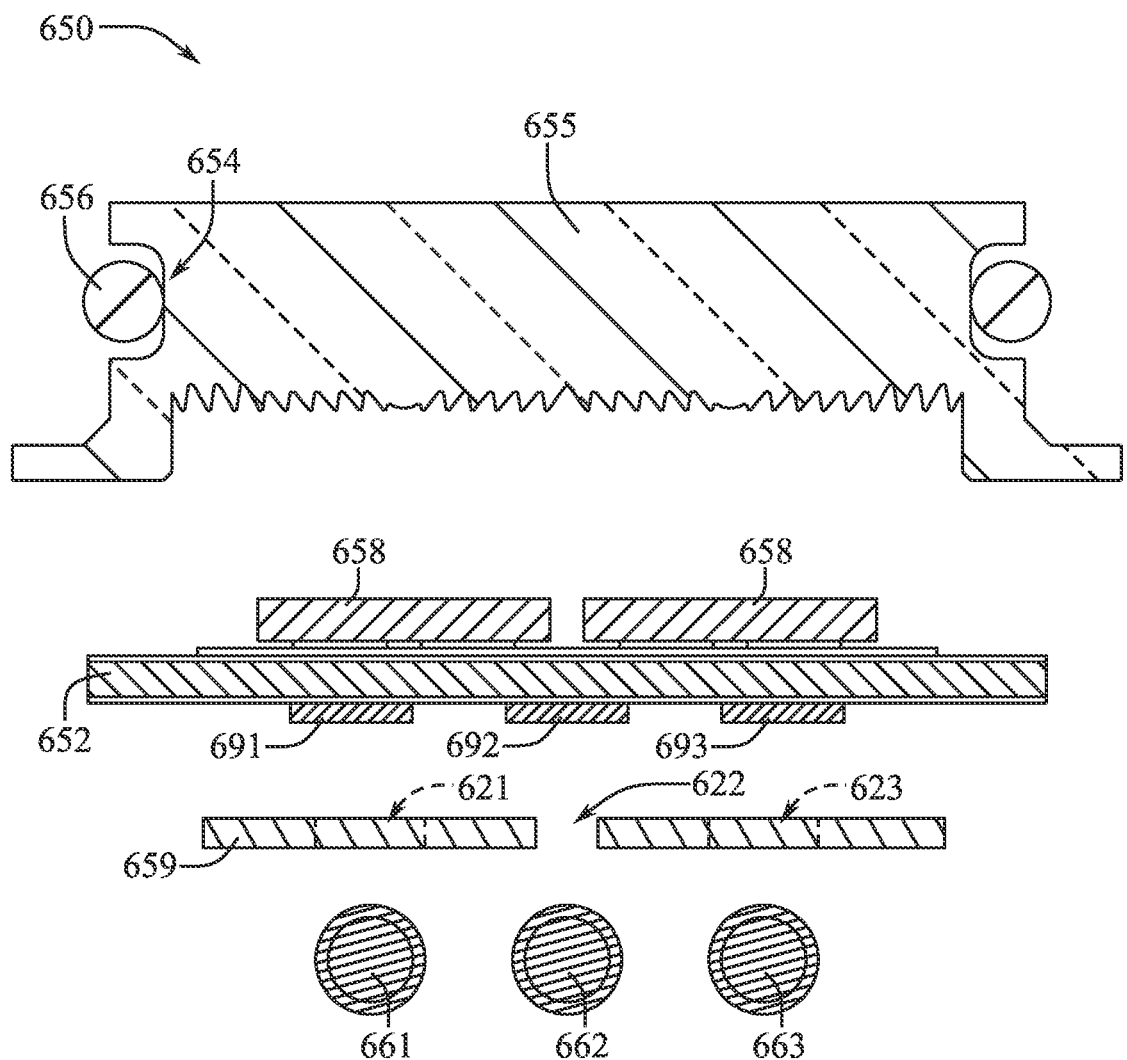
FIG. 8 shows an exploded cross-sectional view of a module of an electronic device.

FIG. 8 shows an exploded cross-sectional view of a module 650 of an electronic device, for example, a strobe module or light emitting module, as described herein. The module 650 can be substantially similar to, and can include some or all of the features of, any of the modules described herein, such as module 150, 250, 350, 450, and 550.

In some examples, the module 650 can include a unitary or singular lens and sidewall component 655 that can define a groove 654, as described herein. A gasket 656, such as an o-ring, can be disposed in the groove 654. The lens 655 can at least partially define an internal volume of the module 650, and a base or a flange portion thereof can be coupled to a substrate 652 that can further define the internal volume of the module 650. In some examples, the substrate 652 can be coupled to the lens 655 by an adhesive or any other desired component or technique. In some examples, light sources 658, such as LEDs 658 can be disposed on the substrate 652 in the internal volume.

The substrate 652 can further include one or more electrical contacts or pads 691, 692, 693 disposed on a side of the substrate that defines an exterior surface of the module 650, for example, the side opposite the LEDs 658, as described herein. The pads 691, 692, 693 can be in electrical communication with the LEDs 658 or other components disposed on the substrate 652. In order to electrically connect these pads 691, 692, 693 to an electrical connector 659, apertures 621, 622, 623 of the connector 659 can be aligned with the corresponding pads 691, 692, 693. In some examples, the connector 659 can define a single aperture for each contact pad of the substrate 652 between which an electrical connection is desired.

During the assembly or connection process between the substrate 652 and the connector 659, once the pads 691, 692, 693 and corresponding apertures 621, 622, 623 are aligned, separate portions of flowable conductive material or solder 661, 662, 663 can be placed over and disposed on the pads 691, 692, 693 and the corresponding apertures 621, 622, 623. In some examples, a single portion of solder 661 can be placed on each corresponding pad 691 and aperture 621 pair. The solder portion 661, 662, 663 can be in a solid state, and can have any desired shape and size, for example, a spherical shape. In some examples and as described herein, the solder 661, 662, 663 can be placed at the desired location by a robot or another automated manufacturing device. Further, during the assembly process, the module 650 and the connector can be aligned with the connector 659 being disposed above the substrate 652. That is, the module 650 and the connector 659 can be arranged upside down relative to the orientation in which they are illustrated in FIG. 8, or in any desired orientation or orientations. This arrangement can allow the solder portions 661, 662, 663 to rest over the apertures 621, 622, 623 and pads 691, 692, 693 without the need for additional components or methods of retention.

With the solder portions 661, 662, 663 disposed at the desired locations in line with the pads 691, 692, 693 and corresponding apertures 621, 622, 623, the solder 661, 662, 663 can be melted and flowed to form an electrical contact between each corresponding pad 691, 692, 693 and apertures 621, 622, 623. In some examples, the solder 661, 662, 663 can be melted by a selective heating process. Once melted and flowed to form the electrical connection, the selective heating process can be ceased and the solder 661, 662, 663 can be solidified to form the electrical connection between the pads 691, 692, 693 and corresponding apertures 621, 622, 623.

In some examples, the melting temperature of the solder 661, 662, 663 can be higher than a melting temperature, a degradation temperature, and/or a glass transition temperature of a material making up one or more components of the module 650, such as the polymeric material forming the lens 655. For example, the lens 655 can include polycarbonate that can have a glass transition temperature of between about 130° C. and 150° C., while the melting temperature of the solder 661, 662, 663 can be between about 180° C. and 200° C. Accordingly, a selective heating process can heat the solder 661, 662, 663 above its melting temperature, while maintaining the temperature of any components, such as the lens 655, below the component's melting, degradation, and/or glass transition temperature.

In some examples, a selective heating process can include focusing or directing the application of heat on a desired location, such as the solder 661, 662, 663. In some examples, heat can be provided by a directed heater or by application of a laser to the solder 661, 662, 663. In some examples, a selective heating process can include cooling or removing heat from desired areas, such as the lens 655. For example, a cold heat conductive medium, such as a cooled gas or liquid, can be applied to all or a portion of the lens 655 to maintain its temperature below a desired level. In some examples, a component, such as the lens 655, can be provided with a protective shield or other barrier to prevent undesirable levels of heating. In some examples, a heat sink or another component can be brought into thermal communication with the component, such as the lens 655, to prevent undesirable levels of heating. In some examples, a selective heating process can include any combination of selective or directed heating and/or cooling processes on any number of components and/or the solder 661, 662, 663, as desired. Various examples of modules and electronic devices, as well as processes for electrically connecting the same to other device components are described below, with reference to FIGS. 9 and 10.

Figure 9:
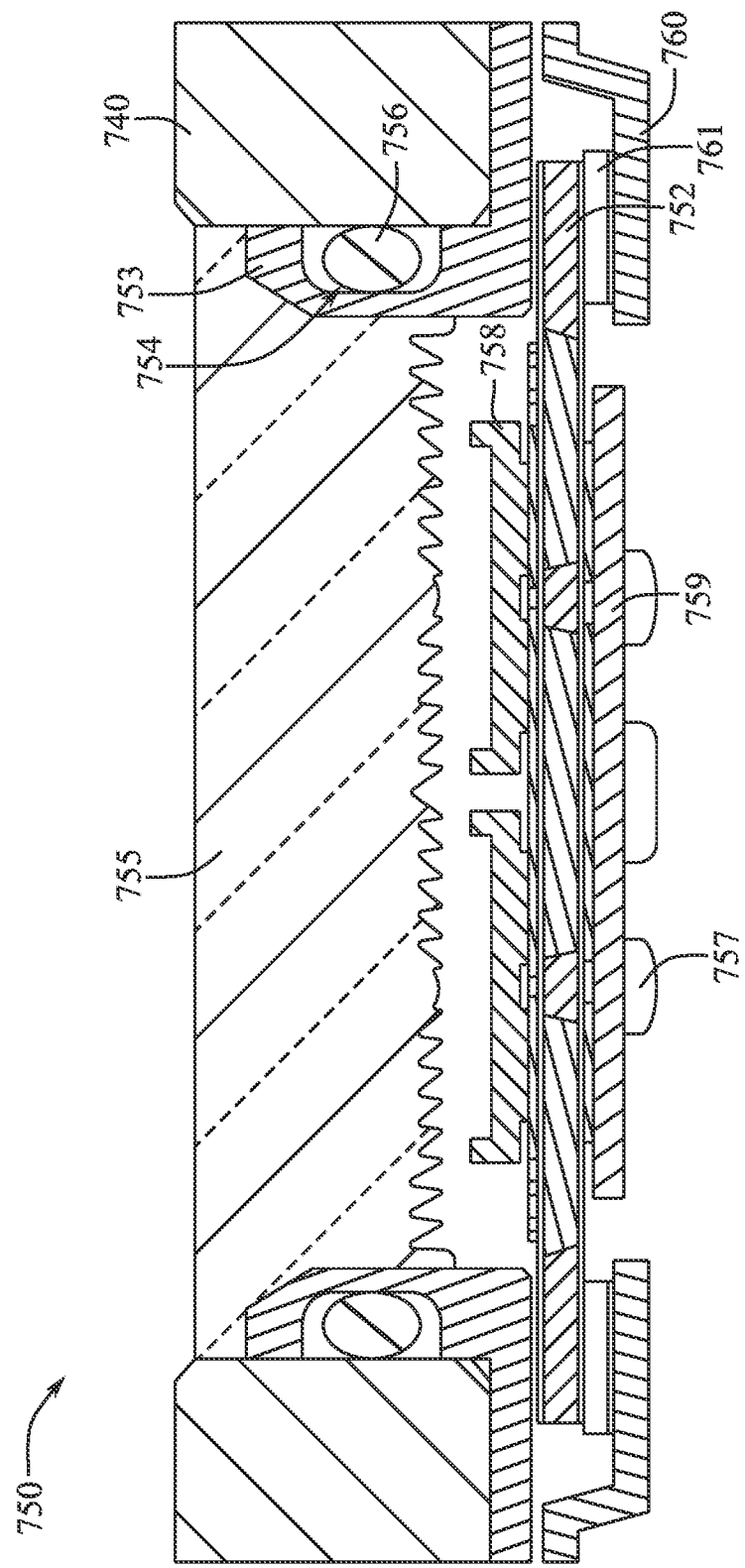
FIG. 9 shows a cross-sectional view of a module of an electronic device.

FIG. 9 shows a cross-sectional view of a module 750 of an electronic device, for example, a strobe module or a light emitting module, as described herein. The module 750 can be substantially similar to, and can include some or all of the features of, any of the modules described herein, such as module 150, 250, 350, 450, 550, and 650.

In the present example, the module 750 can include a substrate 752 at least partially defining an internal volume, with light sources 758 disposed therein on the internal volume, as well as a connector 759 that can be electrically connected to the substrate 752 by solder portions 757, as described herein. Further, the module 750 can be disposed in an aperture defined by a cover 740 of an electronic device and can be retained in this desired position by a brace 760 that can be coupled to the substrate 752, for example, through a portion of a compliant material 761.

Whereas the modules 550 and 650 described previously with respect to FIGS. 7 and 8 include a singular or unitary lens and a sidewall component 555, 655, the module 750 of the present example includes a lens 755 and a sidewall 753 that can be separate components or materials, and that are bonded or otherwise joined together to form the module 750. As with the other sidewalls described herein, the sidewall 753 can define a channel 754, and a gasket 756 can be disposed in the channel to form a seal between the sidewall 753 and the cover 740.

In some examples, the sidewall 753 can be joined or bonded to the lens 755 by any technique known in the art, or developed in the future, such as co-molding, fusing, mechanical interaction, gluing, adhering, welding, any other technique, or combinations thereof. In some examples where both the lens 755 and the sidewall 753 include polymeric material, the lens 755 and the sidewall 753 can be integrally formed by a multi-shot molding process, such as a dual shot injection molding process. For example, the lens 755 can be injection molded, and the sidewall 753 can be formed by a second injection molding process incorporating the formed lens 755.

As the lens 755 includes a transparent material, in some examples, the sidewall 753 and/or gasket 756 can be visible to a user under certain conditions or angles. In such examples, it can be desirable for a color of the sidewall 753 and/or gasket 756 to match or correspond to the color of the exterior surface of the cover 740, to provide a user with a desired cosmetic appearance. In some examples, the sidewall 653 can include a transparent material and the gasket 756 can include the same, similar, matching, or corresponding color as the exterior surface of the cover 740. In some examples, any other portion or component of the strobe module 750, for example any portion or component that may be visible to a user once the module 750 is incorporated into a device, can have the same, similar, matching, or corresponding color as the exterior surface of the cover 740. For example, a material or materials of an ambient light frequency sensor, a thermal sensor, and/or of a solder mask of the substrate 752 can have the same, similar, matching, or corresponding color as the exterior surface of the cover 740. Additional structures and configurations of some examples of a module are described below with reference to FIG. 10.

Figure 10:
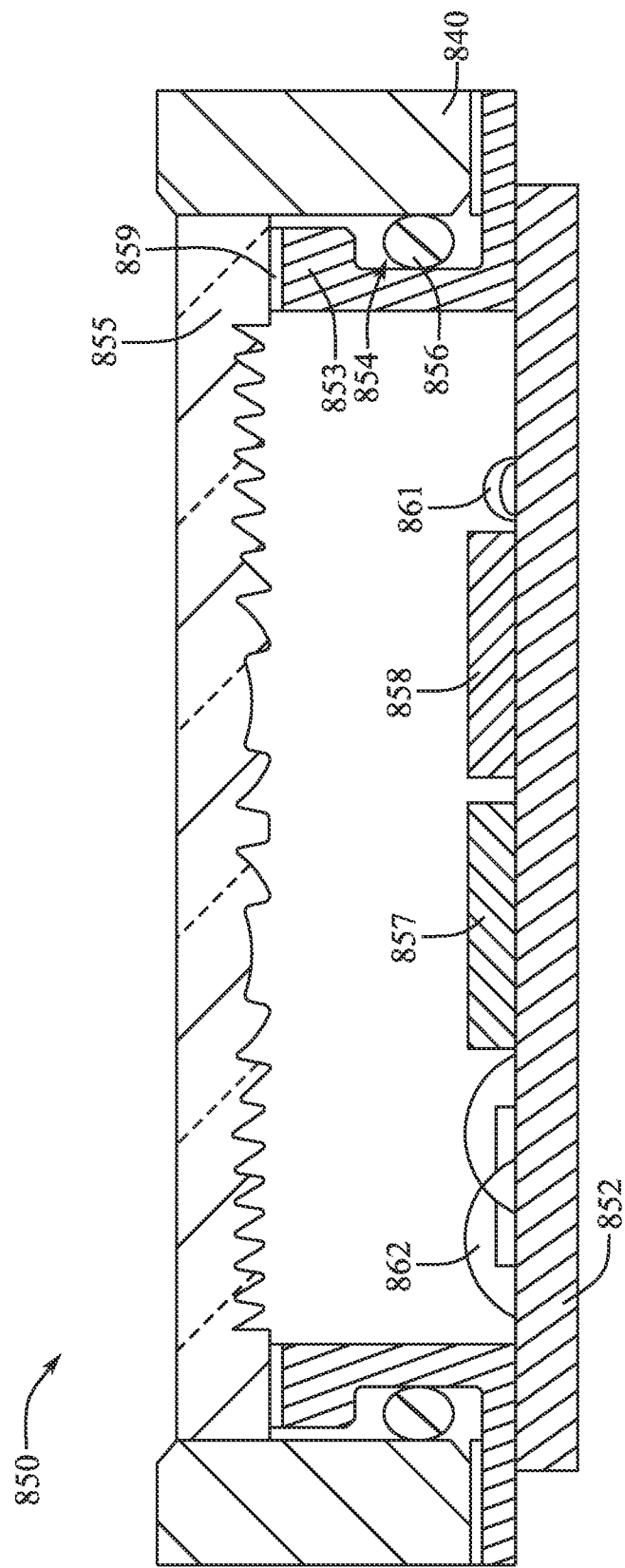
FIG. 10 shows a cross-sectional view of a module of an electronic device.

FIG. 10 shows a cross-sectional view of a module 850 of an electronic device, for example, a strobe module or a light emitting module, as described herein. The module 850 can be substantially similar to, and can include some or all of the features of, any of the modules described herein, such as module 150, 250, 350, 450, 550, 650 or 750.

As with the other modules described herein, the module 850 can include a sidewall 853 that at least partially defines both an internal volume and an exterior or external channel 854. The sidewall 853 can be coupled to a substrate 852, for example, at a flange or a base portion of the sidewall 853. A gasket 856 can be disposed in the channel 854 and can seal the sidewall 853 and a cover 840 of an electronic device in which the module 850 is included, as described herein.

The sidewall 853 can also be coupled to a lens 855 that can define an exterior surface of both the module 850 and a device including the module 850. Whereas some examples of modules described herein include a unitary or integral lens and sidewall, in the example illustrated in FIG. 10, the lens 855 can be bonded or adhered to a top surface of the sidewall 853. In some examples, the lens 855 can be disposed entirely above the sidewall 853, and no portion of the lens can extend into a volume at least partially defined by the sidewall 853. In some examples, the lens 855 can be bonded to the sidewall 853 by an adhesive or a glue, such as a pressure sensitive adhesive 859 or other similar binding material.

In addition to the first light source 857 and the second light source 858, one or more additional components can be disposed on, and can be electrically connected to, the substrate in the internal volume, as described herein. In some examples, one or more sensors 861, 862 can be disposed on the substrate 852 in the internal volume. In some examples, the sensors 861, 862 can be any sensors or other type of component that can interact with, detect, or otherwise rely on light from the ambient environment, for example, light that passes through the lens 855.

In some examples, the sensor 861 can include a thermal sensor that can detect the temperature of at least one of the internal volume of the module 850, the internal volume of a device including the module 850, or an ambient environment outside the module 850. In some examples, the thermal sensor 861 can communicate with one or more other components of the module 850, such as the light sources 857, 858. For example, the thermal sensor 861 can communicate with a processor of the device including the module 850, and if a temperature of the light sources 857, 858 or the internal volume of the module is detected as rising above a predetermined threshold, the processor can modify the behavior or function of the light sources 857, 858, for example, by attenuating or turning off one or both light sources 857, 858 to prevent overheating and possible damage to the module 850.

In some examples, the sensor 862 can include a light sensor, such as an ambient light frequency sensor. The ambient light frequency sensor 862 can receive light from the ambient environment through the lens 855 and can detect the presence and/or amount of any variations in lighting that is not otherwise perceptible to a user. For example, in an environment lit with fluorescent lighting, the lighting can vary, oscillate, or flicker at a rate of about 60 Hz. While this flicker is not apparent to a user, imaging components of an electronic device, such as a camera, can pick-up or be susceptible to the flicker. Accordingly, the ambient light frequency sensor 862 can detect if such a flicker or lighting variation exists and can determine the rate or frequency of the detected flicker. In some examples, the ambient light frequency sensor 862 can detect any number of other properties of ambient light, such as the color or temperature of ambient light, and the intensity of ambient light. In some examples, the ambient light frequency sensor 862 can communicate with the light sources 857, 858 of the module, for example, through a processor of the device, to command the light sources 857, 858 to emit light in such a way as to at least partially attenuate the flicker or lighting variation, and to allow other components, such as a camera, to capture an image or images with attenuated flickering or lighting variations. Additional examples of modules and processes for electrically connecting the same to other device components are described below with reference to FIG. 11.

Figure 11:
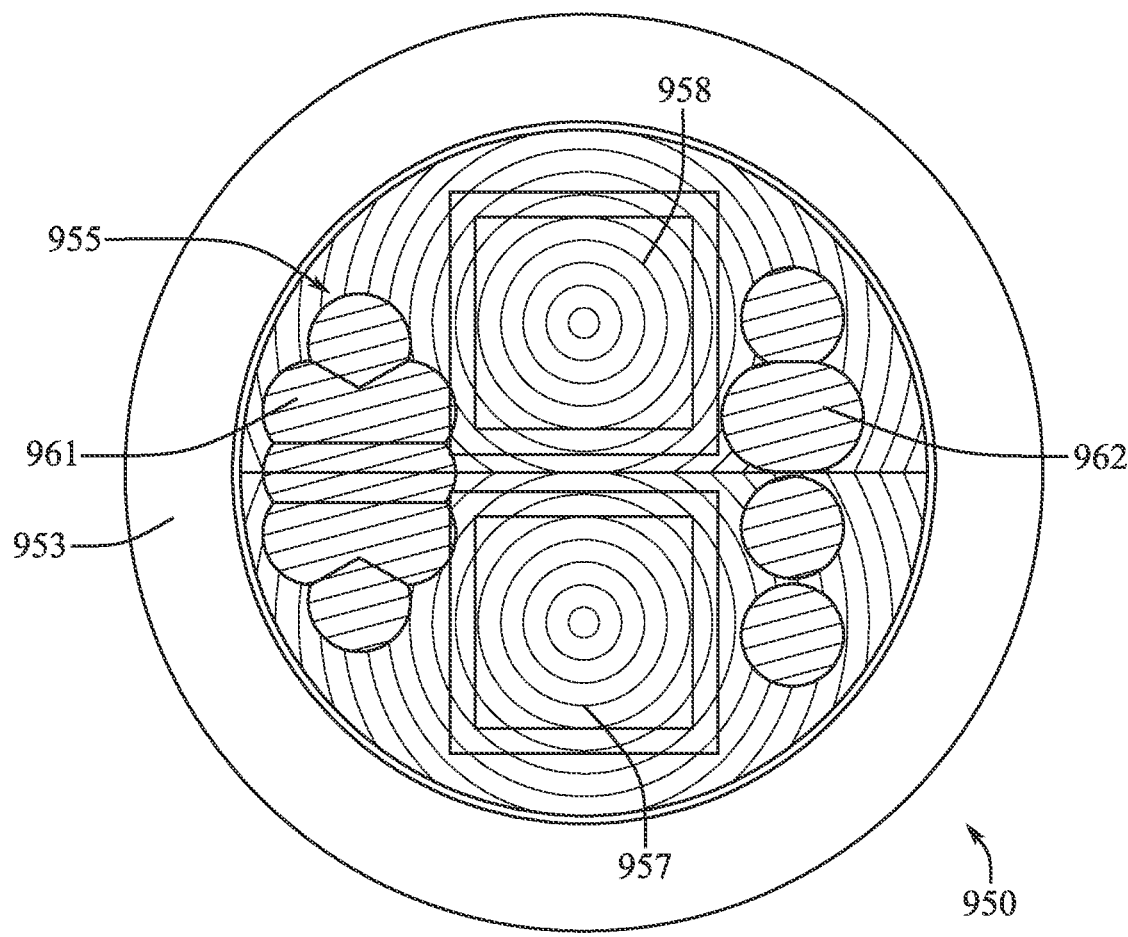
FIG. 11 shows a top view of a module of an electronic device.

FIG. 11 shows a top view of a module 950 of an electronic device, for example, a strobe module or light emitting module, as described herein. The module 950 can be substantially similar to, and can include some or all of the features of, any of the modules described herein, such as module 150, 250, 350, 450, 550, 650, 750, or 850.

As with other modules described herein, the module 950 can include a sidewall 953 that at least partially defines an internal volume, and a lens 955 that at least partially defines the internal volume and an exterior surface of the module 950. A first light source 957 and a second light source 958 can be disposed in the internal volume under, or in line with the lens 955. In some examples, the first and second light sources 957, 958 can be substantially similar or the same components, such as an LED. In some examples, a light source 957, 958 of the module 950 can include an LED having an area of about 1 square millimeter, although substantially any desired size and type of LED can be used. In some examples, the LEDs 957, 958 can be disposed adjacent to one another and can be under a central portion of the lens 955. For example, each of the LEDs 957, 958 can be disposed under a focusing portion of a multifocal Fresnel lens, as shown. In some examples, however, substantially any number, size, and/or type of light source or sources can be disposed in the internal volume of the module 950.

Further, additional components such as sensors 961, 962 can be disposed in the internal volume under the lens 955. In some examples, the module 950 can include an ambient light frequency sensor 961 and a thermal sensor 962, for example, as described with respect to sensors 861, 862 of FIG. 10. In some examples, a module 950 including two LEDs 957, 958 that can be about 1 square millimeter in area can produce a desired level of brightness, while allowing for enough space under the lens 955 that the sensors 961, 962 can be disposed adjacent to the light sources 957, 958 under the lens without the need for a lens having a diameter substantially larger than the width of the light sources 957, 958. Accordingly, in some examples the lens 955 can have a diameter of less than about 10 millimeters, less than about 8 millimeters, less than about 6 millimeters, less than about 4 millimeters, less than about 2 millimeters, or less than about 1 millimeter or smaller.

In some examples, any portion or component of the strobe module 950, for example any portion or component that may be visible to a user once the module 950 is incorporated into a device, can have the same, similar, matching, or corresponding color as an exterior surface of the electronic device including the module 950. For example, a material or materials of an ambient light frequency sensor 961, a thermal sensor 962, and/or of a solder mask of the substrate 952 can have the same, similar, matching, or corresponding color as an exterior surface of the electronic device, such as the portion of the cover of the device surrounding the module 950.

Any number or variety of electronic device components can include the modules described herein, such as a strobe module. The process for joining such a module to an electrical connector can include any combination of localized heating and or cooling processes that can melt solder to electrically connect the module to one or more other components of an electronic device, without undesirably heating other portions of the module. An electronic device including the module can include a cover defining an exterior surface of the device, and an aperture. In some examples, the module can further define the exterior surface, and can be disposed in the aperture such that one or more desired components of the module can be positioned between the exterior surface and an interior surface of the cover. Various examples of modules and electronic devices, as well as processes for electrically connecting the same to other device components are described below with reference to FIG. 12.

Figure 12:
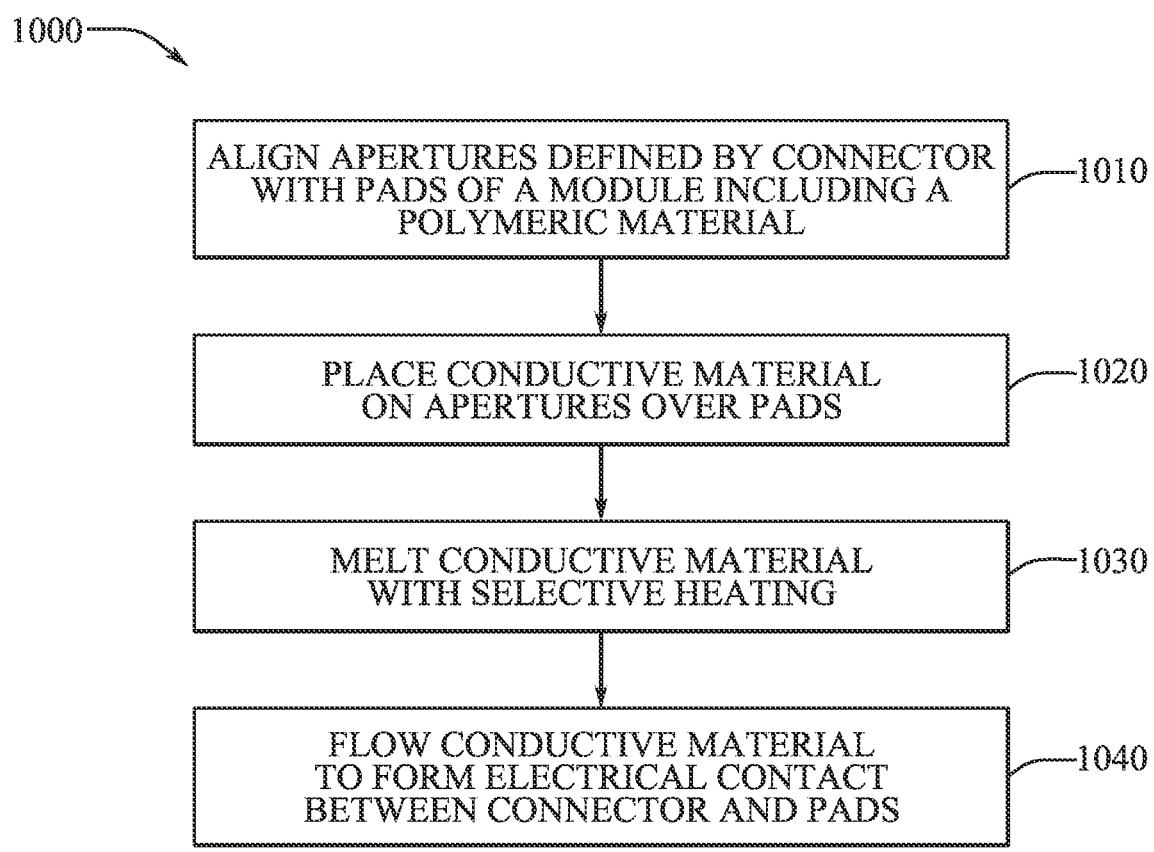
FIG. 12 shows a process flow diagram for a process of joining a module and a connector.

FIG. 12 shows a process flow diagram for a method 1000 of joining a module including a polymer or other heat sensitive material to an electrical connector. The module can include some or all of the features of any of the modules described herein, such as module 150, 250, 350, 450, 550, 650, 750, 850, and 950. The method 1000 can include aligning apertures defined by a connector with contact pads of a module including a polymer or other relatively heat sensitive material at block 1010, placing a flowable conductive material, such as solder, over the aligned apertures and pads at block 1020, melting the conductive material with the selective application of heat at block 1030, and flowing the conductive material at block 1040 to form an electrical contact between the aligned aperture of the connector and the contact pad of the module.

At block 1010, an aperture or apertures define by an electrical connector can be aligned with a corresponding contact pad or pads of a substrate of a module, as described herein with respect to module 650 of FIG. 8. In some examples, the connector can be a flexible connector. In some examples, the substrate can define an exterior surface of the module and can include contact pads that are in electrical communication with one or more components of the module, such as the light sources. In some examples, the aperture or apertures of the connector can be lined, coated, plated, or can otherwise include a conductive contact material that can be in electrical communication with other components of the device, for example, through wires or vias of the connector.

At block 1020, a flowable or malleable conductive material can be placed or positioned in line with the apertures defined by the connector and the corresponding pads of the module. In some examples, the portion or portions of conductive material can be placed over or above each corresponding pad and aperture. In some examples, the module and connector can be positioned or oriented such that the portions of conductive material can rest at a desired location without the need for additional retaining features, materials, components or techniques. In some examples, a robot or other automated manufacturing apparatus can place or position the portions of conductive material in the desired locations. In some examples, a location can be chosen such that the conductive material can melt and flow to form an electrical connection between the contact pad an aperture, as desired.

The flowable or malleable conductive material can be solder, as described herein with respect to solder portions 561, 562, 563 of FIG. 8. In some examples, any form, type, or composition of solder can be used. In some examples, the solder can be any fusible metal alloy, such as an alloy containing one or more of tin, copper, silver, bismuth, indium, zinc, antimony, or other metals. In some examples, the flowable or malleable conductive material can be a curable conductive material, such as a conductive epoxy material. In some example, a conductive epoxy can be applied to desired location, such as in line with the apertures defined by the connector and the corresponding pads of the module.

At block 1030, the solder or conductive material can be melted by a selective heating process. In some examples, a selective heating process can include focusing or directing the application of heat on a desired location, such as the solder or conductive material. In some examples, heat can be provided by a directed heater, by application of a laser to the solder, by solder jetting, and/or by a stream or jet of heated air or gas. In some examples, a selective heating process can include cooling or removing heat from desired areas, such as the polymeric portions of the module, for example, the lens. In some examples, a cold heat conductive medium, such as cooled air or liquid can be applied to all or a portion of the module to maintain the temperature of portions including a polymeric material below a desired level. In some examples, a component including a polymer, such as the lens of the module can be provided with a protective shield or other barrier to prevent undesirable levels of heating in a selective heating process. In some examples, a heat sink or other component can be brought into thermal communication with the component including a polymer, such as lens, to prevent undesirable levels of heating in the selective heating process. In some examples, a selective heating process can include any combination of selective or directed heating and/or cooling processes on any number of components and/or conductive material or solder, as desired.

In some examples, the selective heating process can heat the conductive material above its melting temperature or glass transition temperature. For example, where the conductive material includes solder, the selective heating process can heat the conductive material to above about 180° C., above about 190° C., above about 200° C., above about 225° C., above about 250° C., or even higher. Further, a portion or component of the module including a polymer can be maintained at a temperature below the melting, degradation, and/or glass transition temperature of the polymer during the selective heating process, as described herein. For example, the temperature of the portion of the module including a polymer can be maintained below about 175° C., below about 150° C., below about 140° C., below about 130° C., below about 120° C., below about 110° C., below about 100° C., or even lower.

At block 1040, the melted conductive material can flow to form an electrical contact between corresponding contact pads of the module and aperture of the connector. Although indicated as a separate step from block 1030, in some examples the flowing of the conductive material can occur concurrently with or as a result of the melting achieved by the selective heating process in block 1030. The process 1000 can further include solidifying the melted and flowed conductive material once an electrical contact has been formed. In some examples, the conductive material can be solidified by removing or ceasing the selective heating process.

In some examples, such as where the flowable or malleable conductive material placed or positioned at block 1020 includes a curable conductive material, such as a conductive epoxy, the method 1000 may not comprise a block 1030 and block 1040 may include curing or solidifying the flowable or malleable conductive material at the desired location to form the electrical contact between corresponding contact pads of the module and aperture of the connector. For example, the flowable or malleable conductive material can be placed or positioned in block 1020 while already in a malleable or deformable state and can subsequently be cured or solidified at block 1040 without the need to melt or selectively heat the flowable or malleable conductive material at block 1030. In some examples, the flowable or malleable conductive material can be cured or solidified by exposing the flowable or malleable conductive material to one or more curing agents or environmental conditions. For example, a flowable or malleable conductive material can be cured or solidified by exposure to one or more chemical agents, and/or exposure to certain wavelengths of light, such as UV light.

In some examples, a portion of the conductive material can protrude less than about 160 microns from the surface of the contact pad of the module, as described herein. In some examples, the height from the interior surface of a cover defining an aperture in which the module is disposed to the furthest surface of the conductive material can be less than 1000 microns, less than 900 microns, less than 850 microns, less than 800 microns, less than 750 microns, or less than 700 microns or smaller. In some examples, this height can be about 835 microns.

Any of the features or aspects of the components discussed herein can be combined or included in any varied combination. For example, the design and shape of the modules described herein are not limited in any way, and can be formed by any number of processes, including those discussed herein. Further, the module can include light sources and other components that can emit light or provide any other function by any method now known or discovered in the future. The principles and structure described with respect to the modules can also be used in conjunction with other types of module and/or assemblies and are not limited to being applicable to light emitting modules.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

As used herein, the terms exterior, outer, interior, inner, top, and bottom are used for reference purposes only. An exterior or outer portion of a component can form a portion of an exterior surface of the component but may not necessarily form the entire exterior of outer surface thereof. Similarly, the interior or inner portion of a component can form or define an interior or inner portion of the component but can also form or define a portion of an exterior or outer surface of the component. A top portion of a component can be located above a bottom portion in some orientations of the component, but can also be located in line with, below, or in other spatial relationships with the bottom portion depending on the orientation of the component.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A strobe module, comprising:
   a Fresnel lens at least partially defining an internal volume, the Fresnel lens comprising:
      a lens body; and
      a sidewall at least partially defining the internal volume and an external surface of the Fresnel lens defining an external channel;
   a gasket disposed in the external channel;
   a substrate in contact with the sidewall, the substrate at least partially defining the internal volume; and
   a light source disposed on the substrate in the internal volume.

2. The strobe module of claim 1, wherein the Fresnel lens and the sidewall are a unitary component.

3. The strobe module of claim 1, wherein the sidewall and the lens body are a unitary component.

4. The strobe module of claim 1, wherein the light source comprises a light emitting diode (LED).

5. The strobe module of claim 1, wherein the light source comprises two LEDs and the strobe module further comprises an ambient light frequency sensor and a thermal sensor disposed on the substrate in the internal volume.

6. The strobe module of claim 1, wherein the Fresnel lens comprises polycarbonate.

7. The strobe module of claim 6, wherein a portion of the Fresnel lens defines the external surface, the portion comprising an acrylic hard coat.

8. An electronic device, comprising:
   a cover at least partially defining an external surface of the electronic device and defining an aperture;

a strobe module at least partially disposed in the aperture, the strobe module comprising:
  a Fresnel lens comprising:
    an exterior portion at least partially defining the external surface of the electronic device; and
    a sidewall at least partially defining an internal volume of the strobe module and defining a channel;
  a substrate coupled to the sidewall, the substrate at least partially defining the internal volume;
  a light source disposed on the substrate in the internal volume; and
  a gasket disposed in the channel between the sidewall and the cover, the gasket sealing the sidewall to a surface of the cover defining the aperture.

9. The electronic device of claim 8, further comprising a flexible connector joined to the substrate and in electrical communication with the light source.

10. The electronic device of claim 9, wherein the flexible connector is joined to the substrate with a solder.

11. The electronic device of claim 10, wherein a distance from an internal surface of the cover to a surface of the solder protruding from the flexible connector is less than 1 millimeter.

12. The electronic device of claim 8, wherein the gasket comprises an o-ring.

13. The electronic device of claim 12, wherein the o-ring comprises a same color as a portion of the cover defining the external surface.

14. The electronic device of claim 8, wherein the light source comprises an LED.

15. The electronic device of claim 8, wherein the Fresnel lens comprises a bulk portion comprising a first material.

16. The electronic device of claim 15, wherein the portion of the Fresnel lens comprises a second, different material that is harder than the first material defining the bulk portion.

17. The electronic device of claim 16, wherein the second, different material comprises an acrylic hard coat.

18. The electronic device of claim 8, wherein the sidewall and the Fresnel lens are a continuous portion of transparent polymer.

19. An electronic device, comprising:
  a cover at least partially defining an exterior surface and an interior surface of the electronic device, the interior surface at least partially defining an interior cover volume, the cover defining an aperture that extends through the cover into the interior cover volume;
  a strobe module at least partially disposed in the aperture, the strobe module comprising:
    a lens at least partially defining the exterior surface;
    a sidewall extending from the lens, the sidewall at least partially defining an internal volume and an external channel, the lens and the sidewall forming a unitary component;
  a gasket disposed in the external channel between the sidewall and the cover, the gasket sealing the sidewall to a surface of the cover defining the aperture;
  a substrate in contact with the sidewall, the substrate at least partially defining the internal volume; and
  a light source disposed on the substrate in the internal volume.

20. The electronic device of claim 19, further comprising a flange extending from the sidewall, the flange at least partially defining the internal volume.

* * * * *